US008331369B2

(12) United States Patent
Ee et al.

(10) Patent No.: US 8,331,369 B2
(45) Date of Patent: Dec. 11, 2012

(54) METHODS AND APPARATUS TO DISTRIBUTE NETWORK IP TRAFFIC

(75) Inventors: Cheng Tien Ee, Rockaway, NJ (US); Lee M. Breslau, Basking Ridge, NJ (US); Kadangode K. Ramakrishnan, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 12/343,719

(22) Filed: Dec. 24, 2008

(65) Prior Publication Data

US 2010/0008363 A1 Jan. 14, 2010

Related U.S. Application Data

(60) Provisional application No. 61/079,764, filed on Jul. 10, 2008.

(51) Int. Cl.
*H04L 12/28* (2006.01)
(52) U.S. Cl. ......... 370/392; 370/389; 370/351; 370/388
(58) Field of Classification Search ................. 370/229, 370/231, 235, 252, 352, 358, 395, 397, 398, 370/400, 401; 709/200, 230, 234, 235, 238
See application file for complete search history.

(56) References Cited

U.S. PATENT DOCUMENTS

| | | | |
|---|---|---|---|
| 5,841,775 A | 11/1998 | Huang | |
| 5,917,820 A | 6/1999 | Rekhter | |
| 5,951,651 A | 9/1999 | Lakshman et al. | |
| 6,044,080 A | 3/2000 | Antonov | |
| 6,081,522 A | 6/2000 | Hendel et al. | |
| 6,088,356 A | 7/2000 | Hendel et al. | |
| 6,094,435 A | 7/2000 | Hoffman et al. | |
| 6,192,051 B1 | 2/2001 | Lipman et al. | |
| 6,253,230 B1 | 6/2001 | Couland et al. | |
| 6,256,314 B1 | 7/2001 | Rodrig et al. | |
| 6,438,671 B1 | 8/2002 | Doing et al. | |
| 6,529,475 B1 | 3/2003 | Wan et al. | |
| 6,563,823 B1 | 5/2003 | Przygienda et al. | |

(Continued)

OTHER PUBLICATIONS

Chang et al., "An Empirical Study of Router Response to Large BGP Routing Table Load," Internet Measurement Conference; Proceedings of the 2$^{nd}$ ACM SIGCOMM Workshop on Internet Measurement, held in Marseille, France, pp. 203-208, 2002 (6 pages).

(Continued)

*Primary Examiner* — Hassan Phillips
*Assistant Examiner* — Anez Ebrahim
(74) *Attorney, Agent, or Firm* — Hanley, Flight & Zimmerman, LLC

(57) ABSTRACT

Example methods and apparatus to distribute network IP traffic are disclosed. A disclosed example method includes receiving a first IP control packet at an input of a first server, the first IP control packet being received from a first router, selecting a second router within a router array associated with the first router to send the first IP control packet, the first server selecting the second router by matching a destination IP address of the first IP control packet to a first IP address subspace associated with the second router, transmitting the first IP control packet to the second router, and updating a forwarding table in the first router by associating the destination IP address of the first IP control packet with a first control path from the first router to the second router.

30 Claims, 13 Drawing Sheets

U.S. PATENT DOCUMENTS

| | | | |
|---|---|---|---|
| 6,625,650 | B2 | 9/2003 | Stelliga |
| 6,665,495 | B1 | 12/2003 | Miles et al. |
| 6,680,942 | B2 * | 1/2004 | Mead et al. ............. 370/392 |
| 6,683,874 | B1 | 1/2004 | Nagami |
| 6,721,334 | B1 | 4/2004 | Ketcham |
| 6,771,673 | B1 | 8/2004 | Baum et al. |
| 6,820,132 | B1 | 11/2004 | Puente et al. |
| 6,826,613 | B1 | 11/2004 | Wang et al. |
| 6,847,643 | B2 | 1/2005 | Nie |
| 6,850,525 | B2 | 2/2005 | Mitsumori et al. |
| 6,873,620 | B1 | 3/2005 | Coveley et al. |
| 6,873,627 | B1 | 3/2005 | Miller et al. |
| 6,996,630 | B1 | 2/2006 | Masaki et al. |
| 7,012,919 | B1 | 3/2006 | So et al. |
| 7,024,487 | B2 | 4/2006 | Mochizuki et al. |
| 7,046,680 | B1 | 5/2006 | McDysan et al. |
| 7,065,038 | B1 | 6/2006 | Brandt et al. |
| 7,190,678 | B2 | 3/2007 | Thubert et al. |
| 7,209,439 | B2 | 4/2007 | Rawlins et al. |
| 7,362,702 | B2 | 4/2008 | Terrell et al. |
| 7,362,707 | B2 | 4/2008 | MeLampy et al. |
| 7,411,965 | B2 | 8/2008 | Chu et al. |
| 7,536,464 | B1 * | 5/2009 | Dommety et al. ............ 709/228 |
| 7,944,844 | B2 | 5/2011 | Ee et al. |
| 2002/0116491 | A1 | 8/2002 | Boyd et al. |
| 2003/0005148 | A1 | 1/2003 | Mochizuki et al. |
| 2003/0069952 | A1 | 4/2003 | Tams et al. |
| 2003/0088671 | A1 | 5/2003 | Klinker et al. |
| 2003/0115321 | A1 | 6/2003 | Edmison et al. |
| 2003/0147376 | A1 * | 8/2003 | Coutinho et al. ............ 370/351 |
| 2004/0049714 | A1 | 3/2004 | Marples et al. |
| 2004/0076160 | A1 | 4/2004 | Phaltankar |
| 2004/0095943 | A1 * | 5/2004 | Korotin .................. 370/401 |
| 2004/0170156 | A1 | 9/2004 | O'Neill |
| 2005/0030936 | A1 * | 2/2005 | Van Den Bosch ............ 370/351 |
| 2005/0169270 | A1 * | 8/2005 | Mutou et al. .................. 370/390 |
| 2005/0265308 | A1 * | 12/2005 | Barbir et al. .................. 370/351 |
| 2006/0039385 | A1 | 2/2006 | Bare et al. |
| 2006/0053221 | A1 * | 3/2006 | Matsui et al. ................. 709/225 |
| 2006/0168246 | A1 | 7/2006 | Mochizuki et al. |
| 2006/0171333 | A1 | 8/2006 | Shimada et al. |
| 2006/0190594 | A1 | 8/2006 | Jorgenson et al. |
| 2006/0224724 | A1 | 10/2006 | Marinescu et al. |
| 2007/0058491 | A1 | 3/2007 | Dahlen et al. |
| 2008/0013551 | A1 | 1/2008 | Scholl |
| 2008/0016206 | A1 | 1/2008 | Ma et al. |
| 2008/0155093 | A1 | 6/2008 | Dharmistan |
| 2008/0209273 | A1 | 8/2008 | Bahl et al. |
| 2008/0225713 | A1 | 9/2008 | Tychon et al. |
| 2008/0267195 | A1 * | 10/2008 | Belmon .................. 370/401 |
| 2009/0031022 | A1 | 1/2009 | Wexler et al. |
| 2009/0031041 | A1 * | 1/2009 | Clemmensen ................ 709/244 |
| 2010/0008233 | A1 | 1/2010 | Ee et al. |
| 2010/0008240 | A1 | 1/2010 | Ee et al. |
| 2010/0008363 | A1 | 1/2010 | Ee et al. |

OTHER PUBLICATIONS

Demers et al., "Analysis and Simulation of a Fair Queueing Algorithm," Applications, Technologies, Architectures, and Protocols for Computer Communication; Symposium Proceedings on Communications Architectures and Protocols, held in Austin, United States, pp. 1-12, 1989 (12 pages).

Bu et al., "On Characterizing BGP Routing Table Growth," Computer Networks: The International Journal of Computer and Telecommunications Networking, vol. 45, Issue 1, May 2004 (5 pages).

Braden et al., "From Protocol Stack to Protocol Heap—Role-Based Architecture," ACM SIGCOMM Computer Communication Review, vol. 33, Issue 1, pp. 17-22, Jan. 2003 (6 pages).

Van Der Merwe et al., "Dynamic Connectivity Management with an Intelligent Route Service Control Point," Applications, Technologies, Architectures, and Protocols for Computer Communication; Proceedings of the 2006 SIGCOMM Workshop on Internet Network Management, held in Pisa, Italy, pp. 29-34, 2006 (6 pages).

Kaplan, Hadriel, "Part 3 in the Reliability Series, NSR Non-Stop Routing Technology," Avici Systems, Inc., 2002 (8 pages).

Cranor et al., "Gigascope: A Stream Database for Network Applications," International Conference on Management of Data; Proceedings of the 2003 ACM SIGMOD International Conference on Management of Data, held in San Diego, United States, pp. 647-651, 2003 (5 pages).

Patterson et al., "A Case for Redundant Arrays of Inexpensive Disks (RAID)," International Conference on Management of Data; Proceedings on the 1988 ACM SIGMOD International Conference on Management of Data, held in Chicago, United States, pp. 109-116, 1988 (8 pages).

Crowcroft et al., "Plutarch: An Argument for Network Pluralism," Mar. 24, 2003 (11 pages).

Castineyra et al., "The Nimrod Routing Architecture," Network Working Group, Aug. 1996 (27 pages).

Moy, J., "OSPF Version 2," Network Working Group, Apr. 1998 (204 pages).

Quittek et al., "Requirements for IP Flow Information Export (IPFIX)," Oct. 2004 (31 pages).

Pan et al., "RFCc4090-Fast Reroute Extensions to RSVP-TE for LSP Tunnels," Network Working Group, May 2005 (29 pages).

Rekhter et al., "A Border Gateway Protocol 4 (BGP-4)," Network Working Group, Jan. 2006 (103 pages).

Andersen et al., "Resilient Overlay Networks," ACM SIGOPS Operating Systems Review, vol. 35, Issue 5, pp. 131-145, Dec. 2001 (15 pages).

Shaikh et al., "OSPF Monitoring: Architecture, Design and Deployment Experience," Proceedings of the 1$^{st}$ Conference on Symposium on Networked Systems Design and Implementation, held in San Francisco, United States, vol. 1, 2004 (14 pages).

Yaar et al., "SIFF: A Stateless Internet Flow Filter to Mitigate DDoS Flooding Attacks," pp. 130-143 of the Proceedings of Security and Privacy of the 2004 IEEE Symposium held on May 9-12, 2004 (14 pages).

Zhao et al., "Tapestry: A Resilient Global-Scale Overlay for Service Deployment," IEEE Journal on Selected Areas in Communications, vol. 22, No. 1, pp. 41-53, Jan. 2004 (13 pages).

Tennenhouse et al., "Towards an Active Network Architecture," pp. 2-15 of DARPA Active Networks Conference and Exposition, proceedings held in San Francisco, United States, on May 29-30, 2002 (14 pages).

Yang et al., "A DoS-limiting Network Architecture," IEEE/ACM Transactions on Networking (TON), vol. 16, Issue 6, pp. 1267-1280, Dec. 2008 (12 pages).

Braden et al., "Developing a Next-Generation Internet Architecture," Jul. 15, 2000 (21 pages).

Stoica et al., "Chord: A Scalable Peer-to-Peer Lookup Protocol for Internet Applications," IEEE/ACM Transactions on Networking (TON), vol. 11, Issue 1, pp. 17-32, Feb. 2003 (14 pages).

Katabi et al., "Congestion Control for High-Bandwidth-Delay Product Networks," In the Proceedings on ACM SIGCOMM, held in Pittsburgh, United States, on Aug. 19-23, 2002 (14 pages).

Lakshman et al., "The SoftRouter Architecture," Proceedings of the 3$^{rd}$ HotNets SIGCOMM Workshop on Hot Topics in Networks, held in San Diego, United States, on Nov. 15-16, 2004 (6 pages).

Fenner et al., "Protocol Independent Multicast—Sparse Mode (PIM-SM): Protocol Specification (Revised)," RFC 4601, Aug. 2006 (151 pages).

Fenner te al., "Multicast Source Discovery Protocol (MSDP)," RFC 3618, Oct. 2003, (20 pages).

Harrington et al., "An Architecture for Describing Simple Network Management Protocol (SNMP) Management Frameworks," RFC 3411, Dec. 2002 (65 pages).

Meyer et al., "Report from the IAB Workshop on Routing and Addressing," RFC 4984, Sep. 2007 (40 pages).

Rosen et al., "Multiprotocol Label Switching Architecture," RFC 3031, Jan. 2001 (62 pages).

Le Faucheur et al., "Multi-Protocol Label Switching (MPLS) Support of Differentiated Services," RFC 3270, May 2002 (65 pages).

Blake et al., "An Architecture for Differentiated Services," RFC 2475, Dec. 1998 (37 pages).

Andersson et al., "LDP Specification," RFC 3036, Jan. 2001 (133 pages).

"Internet Research Task Force: Routing Research Group," [retrieved from the Internet on Jul. 14, 2010]. Retrieved from the Internet: http://www.irtf.org/charter?gtype=rg&group=rrg, (3 pages).

"Pluris Massively Parallel Routing," Pluris MPR White Paper, [retrieved from the Internet on Jul. 14, 2010]. Retrieved from the Internet: http://www.academ.com/nanog/feb1998/parallel/index.html, Feb. 1998 (12 pages).

Jen et al., "Towards a New Internet Routing Architecture: Arguments for Separating Edges from Transit Core," In Seventh ACM Workshop on Hot Topics in Networks (HotNets-VII), held in Calgery, Alberta, Canada, Oct. 2008 (6 pages).

K. Kobayashi, "Flexible Arrays of Inexpensive Network (FAIN): Toward global parallelism in the Internet to satisfy future traffic growth," In the Proceedings of the 2008 ACM CoNEXT ReArch Workshop, held in Madrid, Spain. Dec. 2008 (6 pages).

Masi et al., "Modeling Internet Service Provider Backbone Networks," Telecommunications Review, pp. 91-103, 2007 (13 pages).

Scheck, Stephen "Net-BGP-0.10," [retrieved from the Internet on Jul. 16, 2010]. Retrieved from the Internet: http://search.cpan.org/~kbrint/Net-BGP-0.10/lib/Net/BGP.pm, (3 pages).

"Configuring Link Bundling on Cisco IOS XR Software," Cisco Systems, Inc., [retrieved from the Internet on Jul. 16, 2010]. Retrieved from the Internet: http://www.cisco.com/en/US/docs/ios_xr_sw/iosxr_r3.2/interfaces/cofiguration/guide/hc32bund.html, (9 pages).

"Cisco Integrated Routing and Bridging," Cisco Systems, Inc., [retrieved from the Internet on Jul. 16, 2010]. Retrieved from the Internet: http://www.cicso.com/en/US/tech/tk389/tk855/tsd_technology_support_sub-protocol_home.html, (1 page).

"TX Matrix—Central Switching and Routing Element," Juniper Networks, [retrieved from the Internet on: Jul. 16, 2010]. Retrieved from the Internet: http://www.juniper.net/us/en/products-services/routing/t-tx-series/txmatrix/, (1 page).

"Cisco CRS-1 Multishelf System," Cisco Systems, Inc., [retrieved from the Internet on: Jul. 16, 2010]. Retrieved from the Internet: http://www.cisco.com/en/US/products/ps5842/index.html, (1 page).

"The OpenFlow Switch Consortium," [retrieved from the Internet on: Jul. 16, 2010]. Retrieved from the Internet: http://www.openflowswitch.org, (2 pages).

"The BGP Instability Report," [retrieved from the Internet on: Jul. 16, 2010]. Retrieved from the Internet: http://bgpupdates.potaroo.net/instability/bgpupd.html, (5 pages).

Labovitz et al., "Experimental Study of Internet Stability and Wide-Area Backbone Failures," In Proc. International Symposium on Fault-Tolerant Computing, 1998 (22 pages).

"The Netfilter Project," [retrieved from the Internet on: Jul. 16, 2010]. Retrieved from the Internet: http://www.netfilter.org/, (2 pages).

"Avici Composite Links," Avici Systems, [retrieved from the Internet on: Jul. 16, 2010]. Retrieved from the Internet: http://63.111.106.66/technology/composite_links.shtml, (1 page).

"Cisco Visual Networking Index," Cisco Systems, Inc., [retrieved from the Internet on: Jul. 16, 2010]. Retrieved from the Internet: http://www.cisco.com/visualnetworkindex, (15 pages).

Farinacci et al., "Locator/ID Separation Protocol (LISP)," Internet Draft draft-farinacci-lisp-11.txt, Dec. 19, 2008 (58 pages).

Ballani et al., "ViAggre: Making Routers Last Longer!," In NSDI'09: Proceedings of the $6^{th}$ Conference on Symposium on Networked Systems Design & Implementation, USENIX Association, 2009 (6 pages).

Aggarwal et al., "MPLS Upstream Label Assignment and Context-Specific Label Space," Internet Draft draft-ietf-mpls-upstream-label-07.txt, Jul. 10, 2008 (13 pages).

Eatherton et al., "Tree Bitmap : Hardware/Software IP Lookups with Incremental Updates," ACM SIGCOMM Computer Communications Review vol. 34, No. 2, pp. 97-122, Apr. 2004 (26 pages).

Feamster et al., "Detecting BGP Configuration Faults with Static Analysis," In NSDI'05: Proceedings of the Symposium on Networked Systems Design and Implementation, May 2-4, 2005, Boston, MA, May 2005 (23 pages).

Mahajan et al., "Understanding BGP Misconfiguration," SIGCOMM'02, Aug. 19-23, 2002, Pittsburgh, Pennsylvania, (14 pages).

Zhang et al., "Scaling IP Routing with the Core Router-Integrated Overlay," In ICNP'06: Proceedings of the 2006 IEEE International Conference on Network Protocols, pp. 147-156, Washington, DC, 2006 (10 pages).

Bernaschi et al., "SockMi: a solution for migrating TCP/IP connections," In 15th EUROMICRO International Conference on Parallel, Distributed and Network-Based Processing, Feb. 2007 (5 pages).

Hagsand et al., "Design and Implementation of a Distributed Router," In 2005 IEEE International Symposium on Signal Processing and Information Technology, pp. 227-232, Dec. 2005 (6 pages).

"Virtual Bridged Local Area Networks," IEEE Standard for Local and metropolitan area networks, IEEE Std 802.1Q-2005, 2005 (303 pages).

United States Non-Final Office Action, issued by the United States Patent Office in connection with U.S. Appl. No. 12/343,707, on Jul. 22, 2010, 23 pages.

United States Non-Final Office Action, issued by the United States Patent Office in connection with U.S. Appl. No. 12/343,735, on Aug. 19, 2010, 21 pages.

United States Patent and Trademark Office, "Final Office Action," issued in connection with corresponding U.S. Appl. No. 12/343,707, mailed on Jan. 21, 2011, (20 pages).

United States Patent and Trademark Office, "Notice of Allowance," issued in connection with corresponding U.S. Appl. No. 12/343,707, mailed on Apr. 28, 2011, (7 pages).

United States Patent and Trademark Office, "Notice of Allowance," issued in connection with corresponding U.S. Appl. No. 12/343,735, mailed on Feb. 11, 2011, (9 pages).

* cited by examiner

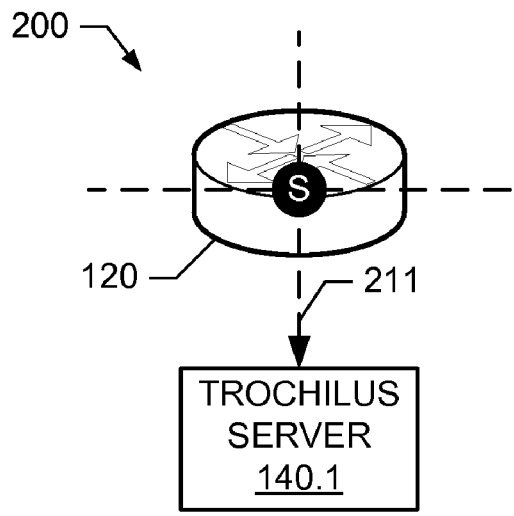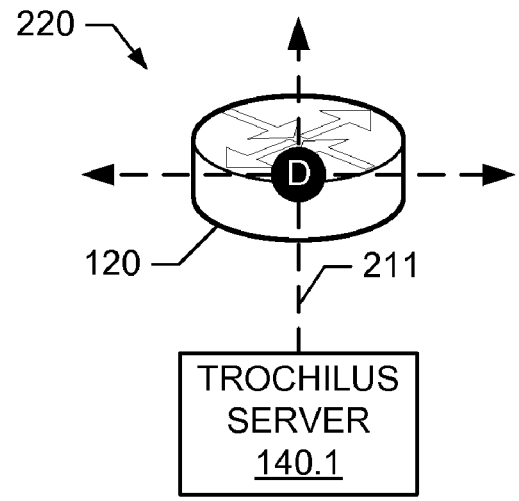
FIG. 2A                FIG. 2B
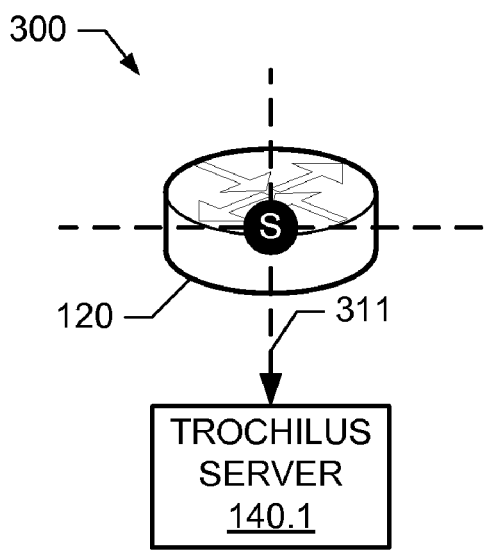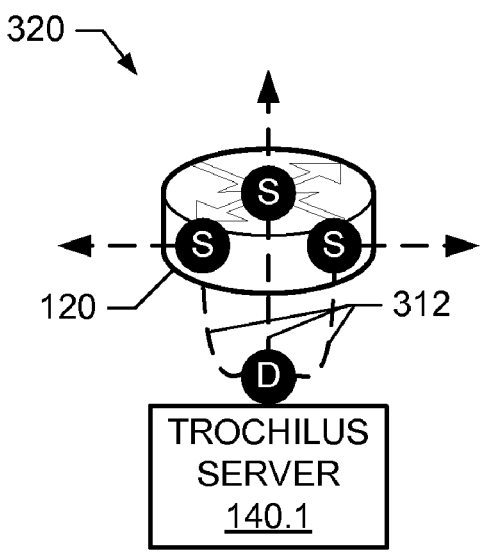
FIG. 3A                FIG. 3B

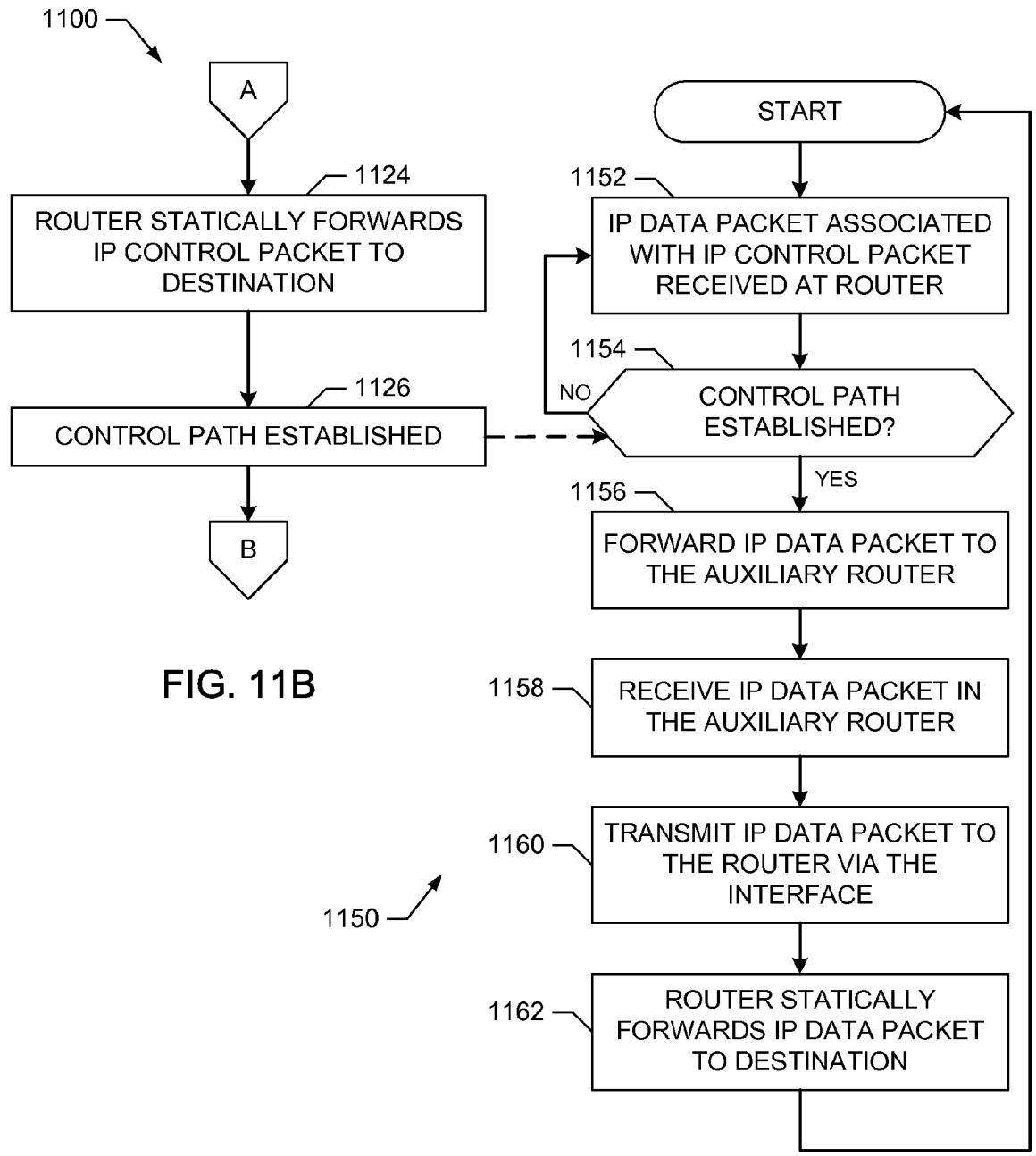

METHODS AND APPARATUS TO DISTRIBUTE NETWORK IP TRAFFIC

RELATED APPLICATIONS

This application claims the benefit of U.S. Provisional Application No. 61/079,764, filed Jul. 10, 2008, the entirety of which is incorporated herein by reference.

FIELD OF THE DISCLOSURE

This disclosure relates generally to packet-switched networks and, more particularly, to methods and apparatus to distribute network Internet Protocol (IP) traffic.

BACKGROUND

As the Internet permeates further into the functions of society including leisure (e.g., Internet Protocol television (IPTV)) and business (e.g., e-commerce), the capacity and reliability required of routers is steadily increasing. An increase in bandwidth requirements is driving changes in the forwarding hardware and software which are currently tailored towards IP. Such changes may necessitate modification to existing protocols and/or introduction of new protocols. Such new and/or modified protocols have traditionally been tested in labs on a small scale.

BRIEF DESCRIPTION OF THE DRAWINGS

FIGS. 2A-2B illustrate an example manner of implementing an example Trochilus server of FIG. 1 with a single interface coupled to a router.

FIGS. 3A-3B illustrate an example manner of implementing the example Trochilus server of FIG. 1 with two or more interfaces coupled to a router.

FIGS. 10, 11A, 11B, 11C, and 12 are flowcharts representative of example machine-accessible instructions that may be executed by, for example, a processor to implement any portion or all of the example Trochilus server of FIGS. 1 and/or 4.

DETAILED DESCRIPTION

Figure 1:
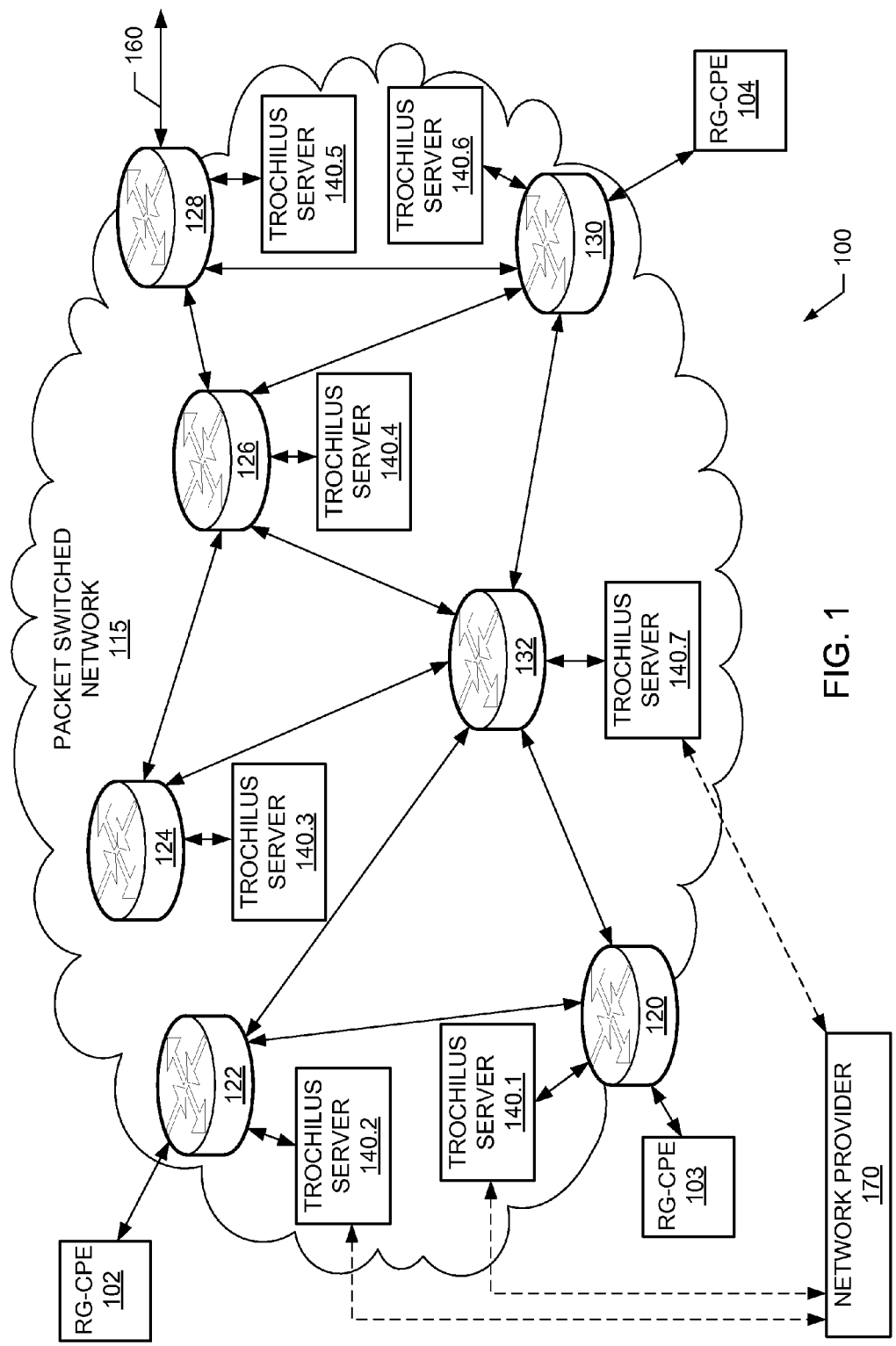
FIG. 1 is a schematic illustration of a packet-switched communication network including example Trochilus servers.

Methods and apparatus to distribute network IP traffic are disclosed. An example disclosed method includes receiving a first Internet Protocol (IP) control packet at an input of a first server, the first IP control packet being received from a first router and selecting a second router within a router array associated with the first router to send the first IP control packet, the first server selecting the second router by matching a destination IP address of the first IP control packet to a first IP address subspace associated with the second router. The example method further includes transmitting the first IP control packet to the second router and updating a forwarding table in the first router by associating the destination IP address of the first IP control packet with a first control path from the first router to the second router.

An example disclosed apparatus includes a receiver to receive a first Internet Protocol (IP) control packet from a first router and a route selector to select a second router within a router array associated with the first router to send the first IP control packet by matching a destination IP address within the first IP control packet to a first IP address subspace associated with the second router and update a forwarding table in the first router by associating the destination IP address of the first IP control packet with a first control path from the first router to the second router. Additionally, the example apparatus includes a transmitter to transmit the first IP control packet to the second router.

The example methods and apparatus described herein are implemented by a Trochilus server that functions as an assistant to a network router by enabling a network provider to quickly deploy in-network services, protocols, and applications without assistance from router vendors. In the past, deploying in-network services involved virtualization at the router-level or exposing the relevant application programming interfaces of the production router (e.g., "off the shelf" routers sold by router venders) to potential issues to enable the extension. Untested changes to production routers can lead to network inefficiencies, router downtime, un-routable network traffic, or unanticipated router functionality. The Trochilus server enables additional functionality to be tested on a network scale level without impact on production-level traffic, thereby ensuring live network level instructions will not increase the likelihood of production router failure and/or reduce network reliability. Functions, in-network services, protocols, and applications are implemented in the Trochilus server independent of the production router. This reduces interactions between the Trochilus server and the production router, thereby reducing strain on production router resources such as, for example, memory and processor cycles.

As the Internet permeates further into the functions of society including leisure (e.g., Internet Protocol television (IPTV)) and business (e.g., e-commerce), the capacity and reliability required of routers is steadily increasing. An increase in bandwidth requirements is driving changes in the forwarding hardware and software, currently used in IP networks. Such changes may necessitate modification to existing protocols and/or introduction of new protocols. Such new and/or modified protocols can be tested in labs on a small scale. However, it is unclear if such new and/or modified protocols will preserve desirable properties such as traffic engineering capabilities when implemented in a large scale, live network. Furthermore, with the increasing number of roles already taken on by the Internet, new and/or more complex services have arisen. For example, the introduction and acceptable operation of IPTV requires network reconvergence of IPTV IP packets to occur within tens of milliseconds. Again, small scale tests of such new services may not accurately predict behavior in a live network.

Given the significant monetary and time investments in the current network infrastructure already made by network providers and vendors, the possible benefits of any new and/or different network architecture or protocol is typically outweighed by its deployment cost. Moreover, research on new protocols often focuses on altering, or even isolating, a single variable in a simulated network laboratory environment or limited testing using production level equipment. Thus, it can be unclear how, for example, multiple new variables, protocols, and/or services will interact with one another and/or the existing network when they are deployed in network-wide production routers and servers. Consequently, there is increased risk associated with simultaneous deployments. These increased risks often slow the adoption rate of new technologies.

A key to network reliability is the ease of troubleshooting and network management. If the network is highly visible, thereby making it easier to detect problematic areas, down times are more likely to be reduced. While there has been an abundance of new routing protocols, much less work has been done on the ease of network recoveries and/or the duration of network recoveries. The work on new protocols has prompted the growth of overlay networks such as Distributed Hash Tables. At the same time, there has been less emphasis on improving the IP and/or network layer. There is a hard limit to the impact of upper layer solutions on issues caused by lower layers. For example, even though end-to-end retransmissions are necessary for complete correctness of packet reception, a wireless multi-hop system can be made much more efficient if link-level retransmissions are used.

Production router vendors and network providers have common and overlapping interests in the functionalities and capabilities required of networking elements. For router vendors, the priority is on the correct implementation of existing protocols based on governing standards to ensure interoperability, and to optimize router performance while minimizing failure rates. However, in addition to these objectives, network providers are interested in performance of the network as a whole. Network performance is directly dependent upon the ease of troubleshooting and management. Based on the requirements of network providers, which may change quickly in response to customer needs or introduction of new services, additional functionalities may need to be rapidly implemented and prototyped in the form of protocols, functions, applications, etc.

Network providers are impeded from directly modifying router code in production routers due to proprietary and reliability reasons. The reliability, efficiency, and time-scales at which functionalities need to be deployed require a separation into different logical components under control of either the vendor or network provider. One such component is the router which is maintained by the vendor and implemented using standardized protocols. Other components, of which there can be several, consequently fall under the domain of the network provider.

To enable the deployment of new internet protocols while maintaining network reliability, the Trochilus server disclosed herein uses current router technology to separate the network into logically different networks in the IP address space. Such separation enables the deployment of potential production router functionalities away from the production router to an external, neighboring server (i.e., the Trochilus server), which in turn, allows rapid prototyping of protocols, without sacrificing router stability or reliability. Generally, the Trochilus server includes functionality for routing and/or distributing IP traffic separate from a production router. Alternatively, in some applications, the Trochilus server updates routing tables within a router for static forwarding by the router. Additionally, the Trochilus server enables deployment of new protocols requiring changes to the control and or data planes, enables high-resolution auditing of the control plane, and enables the logical splitting of production router forwarding information bases into different routers. A packet interface between the production router and the Trochilus server is sufficient to implement additional functionality. Furthermore, mechanisms such as fair queuing is already in place in production routers, and can serve as a means of regulating communication between the Trochilus server and the production router.

The Trochilus server provides operational network stability while enabling network provider administrator control of the server. This approach leverages production router capabilities and minimizes packet processing rates. Since network stability directly impacts customer satisfaction and hence network provider revenue, it should not, as far as possible, be compromised. This stability requirement reduces the ability for providers to incorporate new and experimental functionalities within a production router. Since the Trochilus framework is ultimately communicatively coupled to production routers, network administrators have sufficient control over non-production traffic to enable introduction and/or testing of new functionalities without compromising network stability. For example, the Trochilus server isolates production traffic (i.e., network traffic associated with current network traffic functionality and/or service provision of existing services to existing customers) from non-production traffic (i.e., traffic related to research, experimentation, and/or other functionality not yet offered to customers). Because the Trochilus server does not affect and/or interfere with production network traffic, the administrator can deactivate the Trochilus server without creating adverse network functionality. Additionally, the Trochilus server utilizes its static forwarding capabilities for seamless integration into production routing networks.

Safe prototyping, experimentation, and/or deployment of network layer functionalities (for example, next generation route-tracing tools) are accomplished by explicitly allocating IP address space to one or more Trochilus servers and reusing the current network control planes. This address space separation also enables load-balancing of routing and forwarding table entries across multiple auxiliary routers instead of a single large one. Auxiliary routers may include sub-routers, small routers, or supplementary routers. The IP address space associated with a single router can be partitioned into multiple auxiliary routers responsible for IP address subspaces. Furthermore, by connecting to current network infrastructure, Trochilus servers simplify the creation of a large network testbed for protocols, services, and applications in and/or above the network layer.

The processing by the Trochilus server includes filtering IP packets based on source address, destination address, and/or application data information contained within the IP packet. The Trochilus server filters and/or processes non-production test traffic without any impact on production traffic. Furthermore, the Trochilus server may modify production and/or non-production IP packets for network protocol prototyping and/or for routing IP packets according to forwarding tables within the Trochilus server. Since the Trochilus server is under the complete control of the network provider as opposed to the router vendor, the network provider may change the filters or modify IP packet parameters within the Trochilus server anytime. Furthermore, the Trochilus server may use measurement tools to test prototype network protocols or other functionality across a network in real time without affecting production traffic. This enables a network provider to implement a prototype protocol on a production network using the cabling and production routers of the production network to monitor the performance and efficiency of the prototype protocol without having to modify production routers and without creating network stability issues.

In the interest of brevity and clarity, throughout the following disclosure references will be made to the example packet-switched communication network of FIG. 1. Moreover, the following disclosure references deploying and monitoring network layer functionalities in the example packet-switched communication network through the use of one or more Trochilus servers. However, it should be understood that the methods and apparatus described herein to distribute network IP traffic are applicable to other communication networks, to other network layers, to other types of servers, and/or to other functionalities.

FIG. 1 is a schematic illustration of a communication system 100 including an example packet-switched communication network 115 with example Trochilus servers 140.1-140.7 coupled to respective routers 120-132. Although each router 120-132 is associated with a Trochilus server in the example of FIG. 1, there is no need for a one-to-one correspondence. On the contrary, any number of routers and any number of Trochilus servers may be employed in any combination. For example, more than one Trochilus server may be associated with the same router and/or multiple routers may be associated with the same Trochilus server. Additionally, some routers may not be associated with a Trochilus server.

The example packet-switched communication network 115 provides one or more data communication services (e.g., a transparent local area network (TLAN) service, a virtual local area network (VLAN) service, a dedicated internet access (E-DIA) service, and/or a virtual private local area network service (VPLS)) throughout and/or within a site, a location, a building, a city, a metropolitan area, a geographic area and/or a geographic region. The example packet-switched communication network 115 provides and/or facilitates data communication services between and/or amongst any number and/or type(s) of customer locations 102, 103, and 104. The customer locations include a residential gateway (RG) communicatively coupled to customer premises equipment (CPE). The RG may be implemented by, for example, a VoIP residential gateway, an IP router, a multiport Ethernet switch, a cable modem, a DSL modem, a satellite modem, a firewall, and/or a wireless access point. The RG connects a local network with the packet-switched communication network 115 and/or the Internet. Connected to the RGs are one or more CPEs such as IP Multimedia Subsystem Voice over IP (VoIP) phones, VoIP enabled personal computers (PC), VoIP endpoints, wireless VoIP devices (e.g., a wireless-fidelity (WiFi) Internet protocol (IP) phone), VoIP adapters (e.g., an analog telephone adapter (ATA)), VoIP enabled personal digital assistants (PDA), SIP CPEs, and/or VoIP kiosks. To transport data between the example customer locations 102-104, other customer locations, and/or point of presence network servers, the example packet-switched communication network 115 of FIG. 1 includes any number, type(s) and/or topology(-ies) of packet-switched networks.

The example packet switched network 115 includes routers 120-132 to communicatively couple the example customer locations 102-104 and network servers. The routers 120-132 are packet-based switches such as, for example, the Catalyst 3000 and/or 5000 series of switches from Cisco Systems, Inc. One or more of the customer locations 102-104 may be communicatively coupled to the routers 120-132, and used to access and/or utilize data communication services provided and/or implemented by the example packet-switched communication network 115 of FIG. 1.

In the example of FIG. 1, each of the routers 120-132 is communicatively coupled to a respective example Trochilus server 140.1-140.7. The Trochilus servers 140.1-140.7 of FIG. 1 are separate entities from each other. In an alternative example, the routers 120-132 are communicatively coupled to a single Trochilus server (not shown) or to a single computer system hosting the Trochilus servers 140.1-140.7. Alternatively, one or more of the routers 120-132 may be communicatively coupled to two or more Trochilus servers 140.1-140.7 and/or some routers 120-132 may not be coupled to any of the Trochilus servers 140.1-140.7. The Trochilus servers 140.1-140.7 may be coupled to their respective routers 120-132 via any type(s) of communication technology(-ies) and/or communication link(s).

The routers 120, 122, 128, and 130 function as edge routers and are located at, for example, central office (CO), vault, and/or remote terminal locations. More than one of the customer locations 102-104 and/or network servers may be coupled to the same edge router 120, 122, 128, and 130. The routers 120-132 are communicatively coupled to each other via any type(s) and/or number of access device(s), communication technology(-ies), communication link(s) and/or communication network(s) such as, for example, public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combination and/or hybrid of these devices, systems and/or networks.

Data is routed between the example customer locations 102-104 and/or network servers based on virtual circuits. In general, a virtual circuit represents a logical communication path between a first device (e.g., the router 120) and a second device (e.g., the router 122). Virtual circuits can also be defined to logically connect more than two devices (e.g., in a point-to-multipoint configuration). To send data via a virtual circuit, transmitted data is flagged with a virtual circuit identifier (VCID) (e.g., by storing the VCID within a packet header field). Devices receiving the data (e.g., routers 120-132) use the VCID to determine how to route the data to the correct destination(s). For example, a router 130 receiving data associated with a particular virtual circuit, queries its routing table based on an identified VCID to determine to which device (e.g., another router 126, 128 or 132, and/or a customer location 104) the data is to be forwarded and/or transmitted, and/or via which physical communication link the data is to be forwarded and/or transmitted. The routing tables implemented by the example routers 120-132 associate each virtual circuit with a particular physical route through the packet-switched communication network.

The example communication system 100 of FIG. 1 includes a network provider 170 communicatively coupled to a subset of the Trochilus servers (e.g., servers 140.1, 140.2, and 140.7). Additionally or alternatively, the network provider 170 may be communicatively coupled to all of the Trochilus servers 140.1-140.7 and/or to a defined subset of these servers. Alternatively or additionally, some or all of the Trochilus servers 140.1-140.7 may be in communication with one another to thereby provide indirect communication with the network provider 170.

The network provider 170 has administrative control of the example Trochilus servers 140.1-140.7. For example, the network provider 170 is capable of deploying protocols and/or applications within the Trochilus servers 140.1-140.7, modifying filtering parameters of the Trochilus servers 140.1-140.7, updating forwarding tables within the Trochilus servers 140.1-140.7, modifying monitoring parameters within the Trochilus servers 140.1-140.7, and/or downloading network performance data created and/or stored in the Trochilus servers 140.1-140.7. Furthermore, the example network provider 170 may activate or deactivate some or all of the Trochilus servers 140.1-140.7. The network provider 170 couples the Trochilus servers 140.1-140.7 to their respective routers 120-132 by updating the network forwarding tables within the routers 120-132. The forwarding tables may be updated by the network provider 170 and/or by the vendor of the routers 120-132. The routers 120-132 may be located within the network of the network provider 170, within the example packet-switched communication network 115, and/or within any other network. Additionally, the network provider 170 may form an agreement with a second network provider to couple one or more Trochilus servers 140.1-140.7 to routers within the second network provider network.

The network provider 170 partitions a distinct address domain for the Trochilus servers 140.1-140.7. This enables the network provider 170 to set up static forwarding in the respective routers 120-132 such that the Trochilus servers 140.1-140.7 can receive network traffic. For example, the router 132 of the illustrated example is programmed to include a static forwarding configuration to forward network traffic to Trochilus server 140.7. The static forwarding policy may include forwarding all network traffic received at the router 132, or alternatively, forwarding a subset of network traffic specified by the network provider 170. The subset of network traffic may include and/or be limited to network traffic directed to the address domain of the Trochilus server 140.7. For example, using Cisco's Internetwork Operating System (IOS), an IP policy route-map can be used to specify the address prefixes that are to be forwarded to the Trochilus server 140.7. An example IP policy route-map is shown in the following:

```
Access-list 4 permit 10.10.10.0 0.0.0.255
!
Route-map trochilus permit 10
  match ip address 4
  set ip next-hop 20.20.20.10
!
Interface Ethernet4/2
  ip address 20.20.20.7 255.255.255.0
  ip policy router-map trochilus
```

The line 'set ip next-hop 20.20.20.10' instructs the router 132 to transmit all received network traffic with IP address prefixes of 10.10.10.0 or 0.0.0.255 to the Trochilus server 140.7 located at IP address 20.20.20.10. The IP header included in the IP packets is used by the routers 120-132 to differentiate between production destined for other parts of the network and non-production traffic destined for the Trochilus servers 140.1-140.7.

The Trochilus servers 140.1-140.7 receive IP packets from the respective routers 120-132. The Trochilus servers 140.1-140.7 may filter the received IP packets and/or modify the IP packets based on the particular application of the Trochilus servers 140.1-140.7. The Trochilus servers 140.1-140.7 of the illustrated example are used to deploy and monitor the performance of experimental protocols (e.g., network testbeds), monitor changes in the control plane, and/or route network traffic to enable forwarding table size reduction in production routers 120-132. Completely new routing and/or addressing protocols, with packet headers specific to them, may be implemented.

Network testbeds provide a platform for performance verification of new protocols. Testbeds that approach the scale of actual networks on which these protocols are to be run are preferable, since some issues may not be revealed with a smaller scale testbed. Network scaling involves both the number of network elements and transport (e.g., cables). Furthermore, realistic network operations such as maintenance, is taken into account. In this regard, the Trochilus servers 140.1-140.7 provide a low-cost solution to approximate real network behavior. By coupling to existing routers and cables, the Trochilus servers 140.1-140.7 eliminate the need to create additional router-sites and, thus, the laying of optical cables. Furthermore, maintenance costs are minimized since router-sites are already under operational administration. Additionally, the Trochilus servers 140.1-140.7 connected to the network will experience the same kind of outages (for instance, cablecuts) as the packet-switched communication network 115. For new protocols that are deemed deployable after experimentation on the Trochilus servers 140.1-140.7, the traffic of end-users such as the customer locations 102-104 can be shifted over incrementally (e.g., can go live) by adding their corresponding IP addresses to the Trochilus space.

For example, if the network provider 170 satisfactory tests a new protocol such as, the explicit Control Protocol, the network provider 170 can deploy the explicit Control Protocol in the Trochilus servers 140.1-140.7. The explicit Control Protocol requires explicit feedback from routers (e.g., routers 120-132) along the end-to-end communication path, with the routers updating the feedback field of each IP packet. Computation of round-trip times (which are subsequently used to alter the congestion window sizes of respective end-hosts) is performed in the Trochilus servers 140.1-140.7. Without a Trochilus server, the network provider 170 would be required to test the explicit Control Protocol in a laboratory setting simulating the packet switched network 115. Then, if the testing indicates the new protocol operates without issue, the network provider 170 would be required to deploy the explicit Control Protocol into the software of the production routers 120-132. This approach raises the possibility that the explicit Control Protocol will create errors or issues in the production routers 120-132 that could not be detected in the controlled laboratory environment. Furthermore, the actual software update may lead to downtime of the production routers 120-132. However, if the new protocol is deployed in the Trochilus servers 140.1-140.7, the network provider 170 may test and monitor the performance of the new protocol within the actual production packet switched network 115 without going live and, thus, with reduced risk of service outages or performance degradation. By monitoring the new protocol in the production network using production routers 120-132, the network provider 170 gets protocol network performance test data that otherwise would have been almost impossible to simulate or gather without the possibility of creating performance issues within the production network. Because the routers 120-132 pass IP packets to their respective Trochilus servers 140.1-140.7, the processing and decision making associated with the explicit Control Protocol is conducted in the Trochilus servers 140.1-140.7. This allocation of processor responsibilities limits the memory and processing requirements faced by the routers 120-132 when implementing the new protocol.

The traversal of packets to and from a given router 120-132 may incur delays or drops since these packets are queued within the router 120-132. For protocols that rely on aggregate properties of the data path (e.g., explicit Control Protocol relies on path round trip delay time as opposed to per hop delay), one can incorporate the delays incurred at the router 120-132 into those incurred at the Trochilus servers 140.1-140.7.

The Trochilus servers 140.1-140.7 of FIG. 1 may be used to implement network level capabilities. Using the address-space splitting ability of the Trochilus servers 140.1-140.7, multiple Trochilus servers 140.1-140.7 can process packets from different address ranges. In other words, the Trochilus servers 140.1-140.7 can parallelize the operations of the routers 120-132. For example, a class of Distributed Denial of Service defense involves the use of capabilities, or tokens, that are issued by different network elements that can be verified independently (hence achieving defense-in-depth). Briefly, a source begins by requesting permission to communicate with the destination, which grants permission in the form of a capability. Using this token, subsequent packets in the established flow are checked at every hop by the Trochilus servers 140.1-140.7 to determine if they are authorized. Because this checking is performed with the Trochilus servers 140.1-140.7 instead of in the routers 120-132, the processing load of the routers 120-132 is reduced.

Practical, prior efforts on routing packets across the Internet are focused on overlay-style networks such as Chord, Tapestry, and Resilient Overlay Network. These overlay-style networks implement their own control and data-planes, and rely on the underlying layers to provide basic point-to-point connectivity. In such a context, changes to the network-layer implemented by a network provider and/or a router vendor are confined to the domains of that network provider and/or router vendor. The network-layer includes a control plane and a data plane for routing packets. The Trochilus servers 140.1-140.7 occupy the control plane which relies on the routing protocols (e.g., Open Shortest Path First (OSPF) and Border Gateway Protocol (BGP)) provided by Internet Service Providers, but enables extensions to the data plane. Additionally, the Trochilus servers 140.1-140.7 enable complete replacement of IP routing and addressing in the same space as IP by modifying IP packets.

While overlay networks can overcome some of the limitations of the network layer, certain performance issues are present. For example, overlay recovery times due to physical link failure cannot exceed that of Multi Protocol Label Switching Fast Reroute. In another example, the impact of the defense-in-depth of overlay networks against distributed denial of service algorithms (without modifications to in-network elements) will not be significant due to sole implementation at end-hosts. The Trochilus servers 140.1-140.7 provide an improvement in spatial and temporal resolution over overlay networks by providing a control and data plane for network routing. At the same time, the Trochilus servers 140.1-140.7 enable the processing of additional services and/or improving upon existing network-level services. A unique advantage of the Trochilus servers 140.1-140.7 compared to overlay networks is that, depending on the precise protocols considered, no changes to the end-hosts are necessary. This is unlike overlay networks which require all interested end-users (e.g., customer locations 102-104) to modify their machines.

FIGS. 2A-2B illustrate an example manner of implementing any or all of the example Trochilus servers 140.1-140.7 of FIG. 1 with a single interface 211 coupled to any or all of the routers 120-132. For ease of reference, FIGS. 2A-2B and the following description will refer to router 120 and to the Trochilus server 140.1. In the receiving example 200 of FIG. 2A, incoming IP packets are received in the router 120 from any interface except that connected to the Trochilus server 140.1. Due to the static forwarding (denoted by S) within the router 120, the received IP packets are forwarded to the Trochilus server 140.1 via the single interface 211. The static forwarding capabilities of the production routers (e.g., routers 120-134) are available in current router software such as, for example, the Cisco IOS and next generation IOS.

Once the Trochilus server 140.1 receives the IP packet, the IP packet is processed by the Trochilus server 140.1. The processing may include, for example, modification of the IP packet using, for instance, the Netfilter packet filtering framework. IP packet modification may include changing the source address for routing applications, changing the destination address for routing applications, and/or changing the data in the packet for monitoring applications. Additionally or alternatively, the Trochilus server 140.1 may use information in the IP packet for network performance monitoring, protocol monitoring, and/or network quality monitoring. Since the Trochilus server 140.1 is under the control of the network provider 170 of FIG. 1 as opposed to the router vendor(s) that sold the production routers 120-132, network provider management systems may include off the-shelf end-user machines and/or a combination of such machines and commercial routers. After processing the IP packet, the Trochilus server 140.1 transmits the processed IP packet to another Trochilus server (e.g., Trochilus server 140.3) on the network, another router (e.g., router 124), and/or a server of the network provider 170.

In the transmitting example 220 of FIG. 2B, the Trochilus server 140.1 sends the processed IP packets via the single interface 211 to the router 120 which uses dynamic routing protocols (denoted by D) such as BGP and/or OSPF to route the transmitted IP packet. This configuration enables network-layer IP packet manipulation without the need to provide an alternate control plane. This, in turn, enables monitoring of the control plane by the Trochilus server 140.1.

FIGS. 3A-3B illustrate an example manner of implementing any or all of the example Trochilus servers 140.1-140.7 of FIG. 1 with one or more interfaces coupled to a router 120. FIG. 3A shows the Trochilus server 140.1 receiving IP packets forwarded from the router 120 via a single interface 311, while FIG. 3B shows the Trochilus server 140.1 transmitting IP packets to the router 120 via three interfaces 312. Although FIGS. 3A-3B may refer to any of the Trochilus servers 140.1-140.7, for ease of discussion, the following will refer to Trochilus server 140.1 and router 120. The receiving example 300 of FIG. 3A is similar to the receiving example 200 of FIG. 2A. Incoming IP packets are received in the router 120 from any interface (except the interface connected to the Trochilus server 140.1). Due to the static forwarding (denoted by S) within the router 120, the received IP packets are forwarded to the Trochilus server 140.1 via the single interface 311.

Once the Trochilus server 140.1 receives the IP packet, the IP packet is processed. In the example of FIG. 3B, the processing includes modification of the IP packet using, for example, the Netfilter packet filtering framework. IP packet modification may include changing the source address, changing the destination address, and/or changing the data in the packet. Additionally or alternatively, the Trochilus server 140.1 may use information in the IP packet for network performance monitoring, protocol monitoring, and/or network quality monitoring. Since the Trochilus server 140.1 is under the control of the network provider 170 as opposed to the router vendor(s) that provided the router(s) 120-132, network provider management systems may include off the-shelf end-user machines and/or a combination of such machines and commercial routers. After processing the IP packet, the Trochilus server 140.1 transmits the processed IP packet to another Trochilus server (e.g., Trochilus server 140.5) on the network, to another router (e.g., router 130), and/or to a network provider server.

In the transmitting example 320 of FIG. 3B the Trochilus server 140.1 uses dynamic routing protocols (denoted by D) such as BGP and/or OSPF to route the transmitted IP packets to the appropriate router (e.g., router 130), network server, and/or another Trochilus server (e.g., Trochilus server 140.5). The Trochilus server 140.1 includes a forwarding table for determining the destination and route path. The router 120 receives the transmitted IP packets from the multiple interfaces coupled to the Trochilus server 140.1. In the example of FIG. 3B, the Trochilus server 140.1 transmits IP packets via three interfaces communicatively coupled to the router 120. The router 120 then uses static forwarding to route the transmitted IP packets to their destination or next-hop. In the multi-interface configuration transmitting example 320, both the control and data planes are implemented in Trochilus server 140.1.

Figure 4:
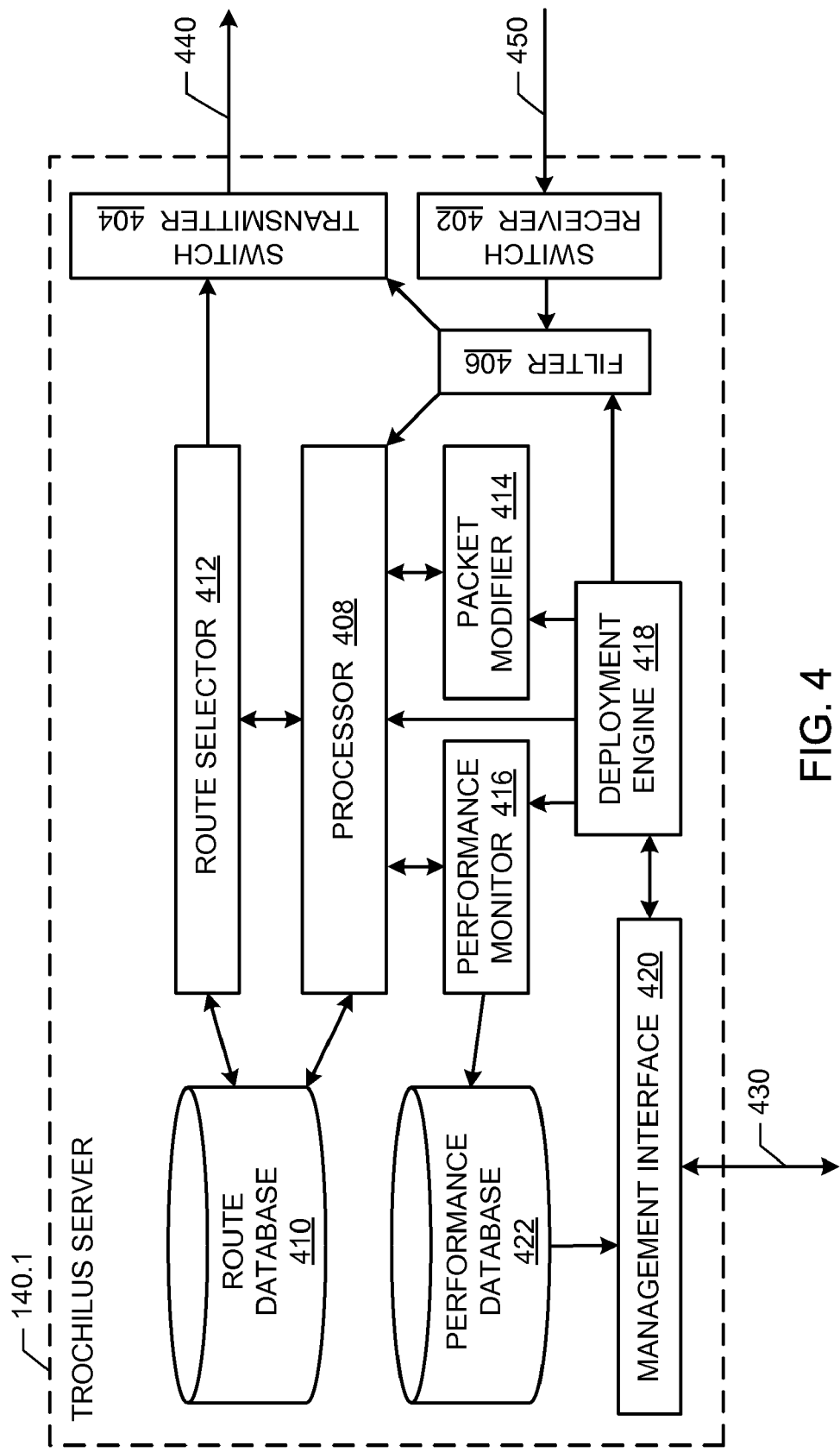
FIG. 4 is a block diagram of the example Trochilus server of FIGS. 2A, 2B, 3A, and 3B.

FIG. 4 illustrates an example manner of implementing any or all of the example Trochilus servers 140.1-140.7 of FIG. 1. Although FIG. 4 may represent any of the Trochilus servers 140.1-140.7, for ease of discussion, the following description will refer to FIG. 4 as representing the Trochilus server 140.1. As elsewhere in this patent, this convention is used without loss of generality and is employed as a convenience, not a limitation. The Trochilus server 140.1 includes a switch receiver 402, a switch transmitter 404, a filter 406, a processor 408, a route database 410, a route selector 412, a packet modifier 414, a performance monitor 416, a deployment engine 418, performance database 422, and a management interface 420. The example Trochilus server 140.1 may be implemented by a personal computer, a server, and/or any other type of computing device. Additionally, the Trochilus server 140.1 may operate on a server and/or computing device processing additional types of applications.

The example management interface 420 of FIG. 4 enables, for example, an operations and support system (OSS) server, a network provider, and/or a user terminal (not shown) to deploy, monitor, modify and/or route network layer functionalities. For example, a network service provider may use the management interface 420 to deploy protocols and/or applications to the Trochilus server 140.1. Additionally, the management interface 420 provides a gateway for a network provider to access monitored network data stored by the Trochilus server 140.1 in the performance database 422. The management interface 420 is connected to a service provider via a network connection 430. The network connection may include any type of communication link.

The switch receiver 402 within the Trochilus server 140.1 receives network traffic, experimental packets, and/or IP packets forwarded from a router (e.g., router 120). The router 120 forwards the IP packets via a receiving link 450 coupled to the Trochilus server 140.1. The receiving link 450 may include a single interface or more than one interface as shown and described in FIGS. 2A, 2B, 3A, and 3B. The switch receiver 402 forwards received IP packets and/or network traffic to the filter 406. The receiving link 450 may include any type of communication link.

To filter IP packets received by the example switch receiver 402, the example Trochilus server 140.1 includes the filter 406. The example filter 406 of FIG. 4 filters the received IP packets and/or network traffic by criteria determined by a network provider. The filtering criteria may be modified by a network provider transmitting modified criteria through the management interface 420 to the deployment engine 418, which then updates the filter 406 with the modified criteria. The example filter 406 may filter IP packets and/or network traffic by type such as, for example, production IP packets and non-production IP packets (e.g., IP packets originating from other Trochilus servers), IP packets for monitoring network performance, IP packets for protocol experimentation, and/or IP packets for route splitting applications. In the example of FIG. 4, the filter 406 sends production IP packets to the switch transmitter 404 for forwarding to the appropriate destination and sends non-production IP packets to the processor 408 for processing. Non-production packets may be identified by headers associated with an experimental protocol and/or application, by a particular source IP address, and/or by data within the packet.

To control the functions, routing, protocols and/or applications implemented by the Trochilus server 140.1, the example Trochilus server 140.1 includes the processor 408. The example processor 408 of FIG. 4 receives IP packets and/or network traffic from the filter 406 and processes the IP packets and/or network traffic based on criteria determined by the network provider 170 of FIG. 1 and/or by the applications implemented in the Trochilus server 140.1. Furthermore, the example processor 408 may generate probe packets and/or IP packets for testing the packet-switched communication network 115 and/or for testing, for instance, an experimental protocol across the packet-switched communication network 115. In addition to any number and/or type(s) of specialized hardware, firmware and/or logic to perform processing functions, the example processor 408 of FIG. 4 includes any number and/or type(s) of specialized and/or general purpose controller(s) and/or processing unit(s) capable of executing coded instructions. For example, the controller and/or processing unit may perform any number and/or type(s) of processing functions by carrying out and/or executing coded instructions present in a memory communicatively coupled and/or within the processor 408 (e.g., within a random-access memory (RAM), a read-only memory (ROM) and/or on-board memory of the processor 408).

To modify and/or manipulate IP packets from the processor 408, the example Trochilus server 140.1 includes the packet modifier 414. The example packet modifier 414 of FIG. 4 modifies data and/or control information within IP packets for applications and/or functions implemented by the Trochilus server 140.1. The packet modifier 414 uses one or more criteria determined by a network provider and/or one or more parameters of one or more applications to modify the contents of the IP packets. The criteria used by the packet modifier 414 may be updated or modified by the deployment engine 418. Modifications that may be made by the packet modifier 414 include, but are not limited to, modifying a source address IP address field, a destination IP address field, a time to live field, a type of service field, a protocol field, and/or modifying information within the data field. An IP packet may be modified for route tracing applications where the monitoring protocol or parameters change and/or in experimental protocol testing where the IP packets may be modified to test different aspects of the protocol. Upon modifying the IP packets, the packet modifier 414 sends the modified IP packets back to the processor 408. Furthermore, the packet modifier 414 may analyze the data within the non-production IP packets, terminate the non-production IP packets, or process the non-production IP packets.

To analyze the performance of the packet-switched communication network 115 of FIG. 1, links between the routers 122-132, an experimental protocol, experimental function, and/or an experimental application, the example Trochilus server 140.1 includes the performance monitor 416. The example performance monitor of FIG. 4 monitors and stores data within probe packets and/or IP packets that provides information with respect to performance, quality, and/or reliability. The example performance monitor 416 receives the IP packet(s) and/or network traffic from the processor 408, analyzes and/or processes the IP packet(s), and stores data associated with the IP packet(s) in the performance database 422.

The example performance database 422 of FIG. 4 may be implemented by any number and/or type(s) of data structures. The performance database 422 may be stored in any number and/or type(s) of memories and/or memory devices. Additionally, the network provider 170 of FIG. 1 may access the performance database 422 via the management interface 420 to access and process the collected monitoring data. The network provider 170 may access the monitoring information continuously or at periodic intervals.

The example performance monitor 416 of FIG. 4 may monitor and/or analyze the IP packets to calculate the routing efficiency and/or identify issues associated with experimental protocols and/or applications. Furthermore, the performance monitor 416 may monitor and store data for production network route tracing applications. For example, the performance monitor 416 of the illustrated example stores the last seen IP address of the IP packet from the last hop router and the per-destination IP address of the IP packet such that a determination can be made about possible production network routing changes and/or production network forwarding table modifications. Additionally or alternatively, the example performance monitor 416 of FIG. 4 may calculate the travel time of the IP packets associated with an experimental protocol to reach the router, determine the packet quality of IP packets associated with an experimental protocol, calculate the reliability of an experimental protocol, and/or measure the performance of an experimental protocol. Upon storing monitoring information from the IP packet, the performance monitor 416 forwards the IP packet back to the processor 408. The criteria and parameters employed by the performance monitor 416 in monitoring IP packets are specified by the network provider 170. The network provider 170 may update or change the criteria and/or parameters used in such monitoring via the deployment engine 418 by accessing the management interface 420 which is preferably password protected.

The example deployment engine 418 of FIG. 4 may be used by the network provider 170 to schedule and deploy experimental network protocols, applications, network services, network enhancements, and/or network functions. The deployment engine 418 deploys the received protocols and applications at a time specified by the network provider 170. For example, the network provider 170 may deploy a new protocol across a plurality of Trochilus servers. To ensure the protocol comes online at the same time in all the Trochilus servers, the network provider 170 may schedule the deployment time in the deployment engine 418. This enables the network provider 170 to ensure the protocol has been uploaded into the desired Trochilus servers without issue and minimizes any initial issues the protocol may experience if one or more Trochilus servers do not initiate the new protocol at the same time as the other Trochilus servers. Additionally, the deployment engine 418 may be used to schedule the length of time a protocol is to be deployed. For example, a protocol may be scheduled to be deployed within Trochilus servers for one week for development testing. The deployment engine 418 deploys a protocol and/or application by loading the protocol and/or application into the processor 408. The processor 408 then adds the received protocol and/or application to its processing functions. Additionally, the deployment engine 418 may load updated or modified IP packet modification information to the packet modifier 414 and/or IP packet monitoring criteria to the performance monitor 416.

To distribute IP packets for route splitting applications, the example Trochilus server 140.1 includes the route selector 412. The example route selector 412 of FIG. 4 selects one or more auxiliary routers within a router array and/or the router 120 communicatively coupled to the Trochilus server 140.1 and forwards IP packets to the selected auxiliary routers. The route selector 412 may access the router database 410 for the routing and/or forwarding tables to determine which auxiliary router is to route the IP packets. For example, the route selector 412 receives IP packets with a destination of 128.11.2.1. The route selector 412 selects an auxiliary router assigned to the IP address space that includes the destination 128.11.2.1. The route selector 412 then forwards the IP packets to that auxiliary router. In response to receiving the IP packets, the auxiliary router uses a routing table to determine which interface within the router 120 to route the IP packets through. The auxiliary router then sends the IP packets through that interface for transmission to the destination of the IP packets. In other example implementations, the one or more auxiliary routers in the router array may be implemented within the example route selector 412 and/or the example Trochilus server 140.1.

In other applications, the example route selector 412 selects an interface to the communicatively coupled router 120 via the switch transmitter 404 for routing non-production IP packets. The route selector 412 uses forwarding tables in the route database 410 to determine the next hop router for an IP packet and/or network traffic. The forwarding tables may include route splitting information for routers 120-132 such that IP packets are forwarded to a router (e.g., router 132) based on packet type (e.g., control or data). Additionally, the forwarding tables may include forwarding IP addresses for other Trochilus servers (e.g., Trochilus servers 140.2-140.7) such that IP packets can be routed directly through Trochilus servers in a data plane (e.g., the Trochilus data plane 704 of FIG. 7).

Based on the routing information stored in the example route database 410, and using any suitable method(s), message(s), protocol(s) and/or data structure(s), the example route selector 412 of FIG. 4 generates and/or provides routing instructions to packet-switched network nodes. In the illustrated example, the routing instructions are based on routing tables stored in the route database 410. In general, a routing table defines how data received on a particular communication link for a particular virtual circuit is to be processed, routed and/or handled (e.g., transmitted on a given communication path, transmitted to a given switch, etc.). In some examples, routing tables provided to a particular router are specific to that router and/or only include routing information for those virtual circuits transported by and/or through the router. In other examples, each router is provided with an identical routing table identifying all routers in the network. Any number and/or type(s) of data structures may be used to implement a routing table. The route selector 412 forwards the IP packet to the appropriate interface within the switch transmitter 404. For example, the switch transmitter 404 may include interfaces to logical routers as described in connection with FIGS. 5-6. The switch transmitter 404 forwards IP packets and/or network traffic from the route selector 412 to the next hop router or Trochilus server via a link 440. The link 440 and the switch transmitter 404 may include one or more interfaces so that the route selector 412 can route network traffic to one or more routers 120-132, logical routers, or Trochilus servers 140.1-140.7 through the appropriate interface.

While an example manner of implementing the Trochilus servers 140.1-140.7 of FIG. 1 has been illustrated in FIG. 4, one or more of the interfaces, data structures, elements, processes and/or devices illustrated in FIG. 4 may be combined, divided, rearranged, omitted, eliminated and/or implemented in any other way. For example, any or all of the example switch receiver 402, the example switch transmitter 404, the example filter 406, the example processor 408, the example route database 410, the example route selector 412, the example packet modifier 414, the example performance monitor 416, the example deployment engine 418, the example performance database 422, and/or the example management interface 420 illustrated in FIG. 4 may be implemented separately and/or in any combination using, for example, machine-accessible instructions executed by one or more computing devices and/or computing platforms (e.g., the example processing platform 1000 of FIG. 10). Further, the example switch receiver 402, the example switch transmitter 404, the example filter 406, the example processor 408, the example route database 410, the example route selector 412, the example packet modifier 414, the example performance monitor 416, the example deployment engine 418, the example management interface 420, the example performance database 422, and/or, more generally, the Trochilus server 140 may be implemented by hardware, software, firmware and/or any combination of hardware, software and/or firmware. Thus, for example, any of the example switch receiver 402, the example switch transmitter 404, the example filter 406, the example processor 408, the example route database 410, the example route selector 412, the example packet modifier 414, the example performance monitor 416, the example deployment engine 418, the example management interface 420, the example performance database 422, and/or, more generally, the example Trochilus server 140 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example switch receiver 402, the example switch transmitter 404, the example filter 406, the example processor 408, the example route database 410, the example route selector 412, the example packet modifier 414, the example performance monitor 416, the example deployment engine 418, the example management interface 420, the example performance database 422, and/or the example Trochilus server 140 are hereby expressly defined to include a tangible medium such as a memory, DVD, CD, etc. storing such software or firmware. Further still, the example Trochilus server 140 may include additional devices, servers, systems, networks, gateways, portals, and/or processors in addition to, or instead of, those illustrated in FIG. 4 and/or may include more than one of any or all of the illustrated devices, servers, networks, systems, gateways, portals, and/or processors.

Figure 5:
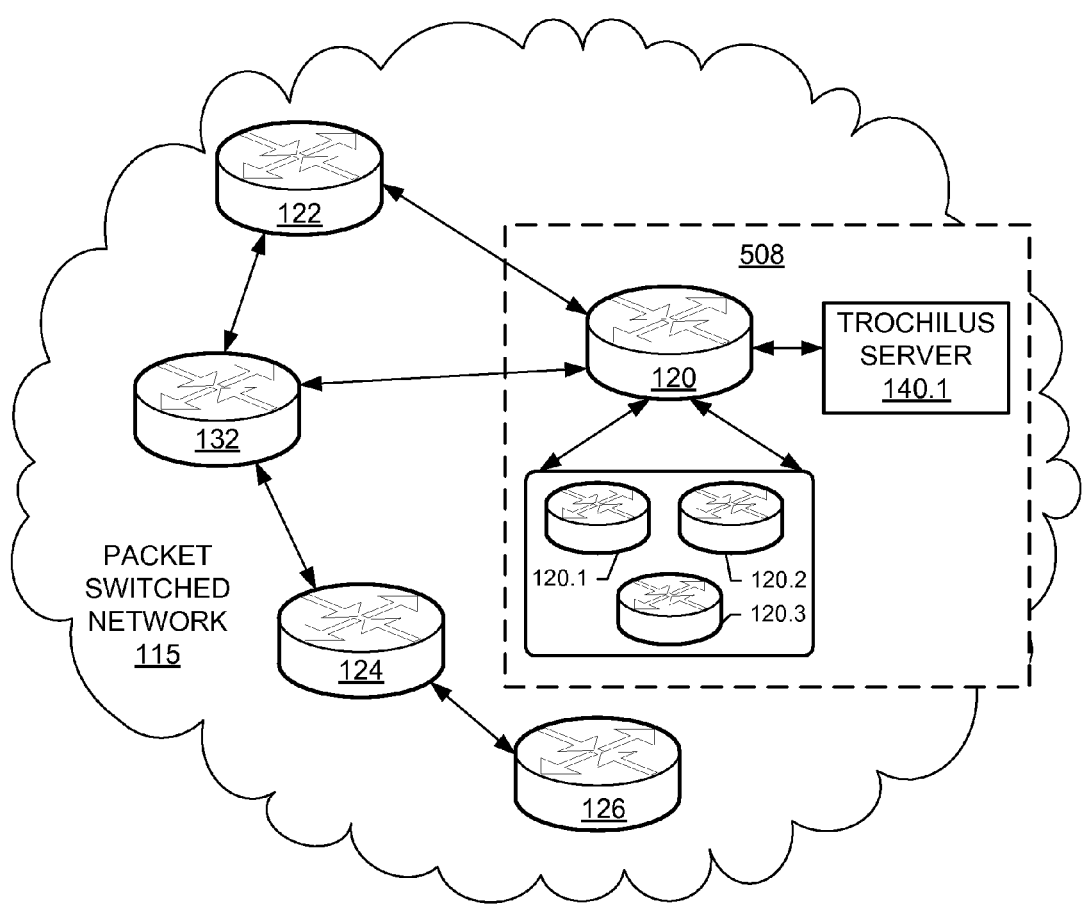
FIG. 5 is a schematic illustration of the packet-switched communication network of FIG. 1 including the Trochilus server of FIG. 4 implementing a route splitting application.

FIG. 5 is a schematic illustration of the packet-switched communication network 115 of FIG. 1 including the Trochilus server 140.1 of FIG. 4 implementing a route splitting application 508. The Trochilus server 140.1 receives network traffic and/or IP packets via static forwarding from a communicatively coupled router 120 and forwards the traffic to one of three auxiliary routers 120.1-120.3 included within the larger router 120. The Trochilus server 140.1 is used in this route splitting application to balance network traffic among the three auxiliary routers 120.1-120.3. The auxiliary routers 120.1-120.3 are routers included within the router 120 to form a single logical router. For example, each auxiliary router 120.1-120.3 may process network traffic for a specified destination IP address range. Thus, the functionality of the larger router 120 is partitioned into the three auxiliary routers 120.1-120.3. The packet-switched communication network 115 includes routers 122-132 linked to each other and to the router 120.

Figure 6A:
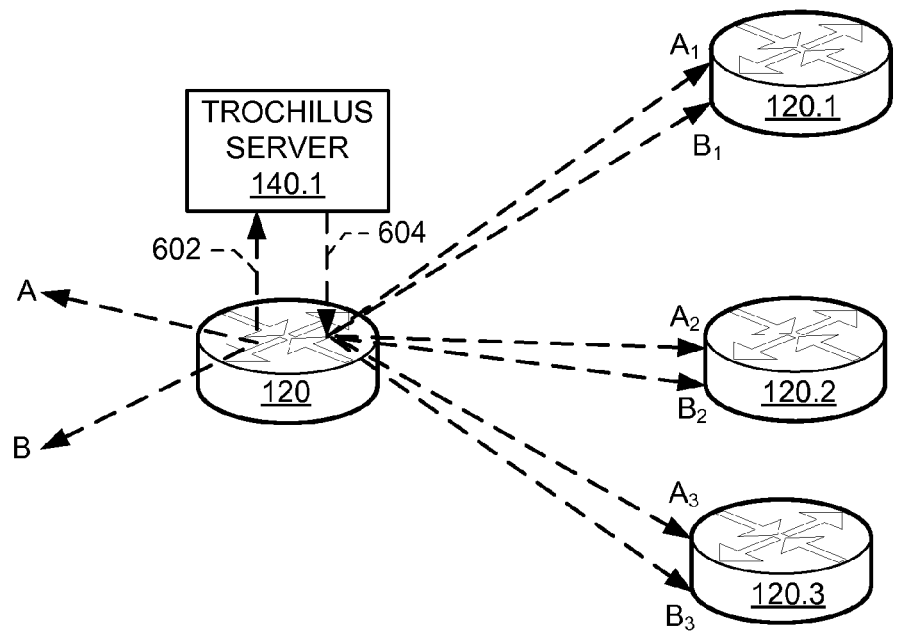
FIG. 6A is a schematic illustration of the example Trochilus server of FIG. 4 implementing the route splitting application for the production router into the three logical routers of FIG. 5.
Figure 6B:
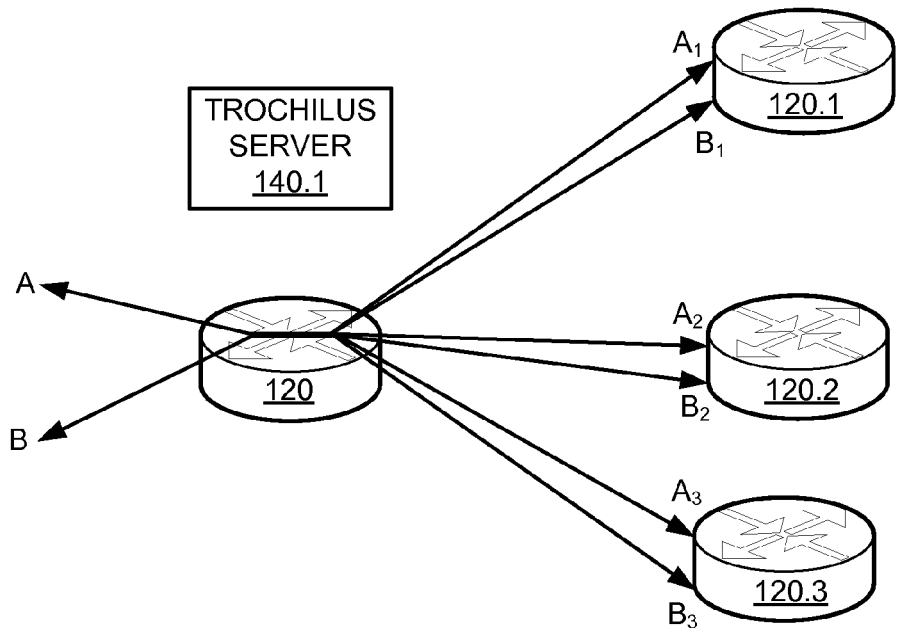
FIG. 6B is a schematic illustration of the example Trochilus server of FIG. 4 implementing the route splitting application for IP data packets associated with IP control packets routed in FIG. 6A.

The router 120 receives and selectively forwards control packets to the Trochilus server 140.1. This has the effect of having the Trochilus server 140.1 maintain the control state for the IP address space subset for each of the smaller servers 120.1-120.3. The Trochilus server 140.1 forwards IP packets and network traffic based on its destination, to a selected one of the auxiliary routers 120.1-120.3. The selected auxiliary router is responsible for the IP address space associated with the destination. Based on the outgoing interface from the router 120 (hence incoming interface to the Trochilus server 140.1), the outgoing interface from the Trochilus server 140.1 is determined. FIGS. 6A and 6B show an example of interfaces between the auxiliary routers 120.1-120.3, the larger router 120, and the Trochilus server 140.1.

An issue in current networks is the growth of routing and forwarding table sizes due to address fragmentation, multihoming, etc. The example Trochilus server 140.1 of FIG. 5 solves this issue by using its forwarding capabilities to split a single, large router's routing and forwarding capabilities into several auxiliary routers (e.g., auxiliary routers 120.1-120.3). The Trochilus server 140.1 coupled with the router 120 distributes the network traffic based on type (control or data), and, in the case of IP packets, also address. This configuration enables routers 120.1-120.3 in the route splitting application 508 to each be responsible for a subset of the address space. This solution enables fast router failover when subsets of the space overlap (i.e., hot standbys), and also enables power savings during off-peak hours by powering down parts of the array.

The increase in Internet routing prefixes and line speeds indicate that new routers must replace older ones more frequently. This in turn reduces network reliability because new routers typically result in issues and, therefore, higher mean time to repair. The above described route splitting application 508 using the Trochilus server 140.1 enables the addition of more routers (e.g., the auxiliary routers 120.1-120.3) to handle the load increase. Since these routers (e.g., the auxiliary routers 120.1-120.3) are assigned a subsection of IP address space, the time to deploy is reduced as new auxiliary routers can incrementally be assigned IP address space, which significantly improves network reliability.

Furthermore, router replacement (due to failures, upgrades, etc.) can be performed locally (e.g., by adding an auxiliary router 120.4, etc,) without relying on the network to reroute traffic (e.g., since traffic is still routed to router 120). This eliminates the need for network reconvergence, as well as congestion due to insufficient capacity for rerouted traffic. Because load from the router 120 is distributed amongst multiple auxiliary routers 120.1-120.3, line cards for routing IP traffic within the router 120 maintain state to each router 120.1-120.3 only for a subset of the address space. This configuration enabled by the Trochilus server 140.1 results in fewer routing and forwarding table entries for the router 120 and enables better network scaling. Furthermore, with the IP packet forwarding load reduced in the router 120, more processing can be performed in the router 120 for other applications such as, for example, processing at high resolutions using a Netflow monitoring application.

FIG. 6A is a schematic illustration of the example Trochilus server 140.1 of FIG. 4 implementing the route splitting application 508 for the router 120 into the three auxiliary routers 120.1-120.3 of FIG. 5. The example of FIG. 6A shows the route splitting application 508 for IP control packets. The IP control packets establish a control path from a source to a destination (e.g., the customer locations 102-104 of FIG. 1) within the packet-switched communication network 115. The IP control packets include routing information. The control path enables the packet-switched communication network to route IP data packets associated to the IP control packets from the source to the destination. The IP data packets include application information. The example Trochilus server 140.1 of FIG. 6A uses the IP control packets to establish a control path within the router 120 so that IP data packets are statically forwarded from the router 120 to the appropriate auxiliary routers 120.1-120.3. The auxiliary routers 120.1-120.3 may be included in a router array. In some examples, the router array including the auxiliary routers 120.1-120.3 may be included within the router 120 or alternatively, the Trochilus server 140.1.

The example router 120 communicates with external routers (e.g., the routers 122-132) via IP interfaces, maintaining the same interface to the network as if the Trochilus server 140.1 was not present. FIG. 6A shows the example Trochilus server 140.1 receiving IP control packets from the router 120 via a connection 602. The example router 120 receives the IP control packets from other communicatively coupled routers (e.g., the routers 122-132). Upon receiving the IP control packets, the router 120 statically forwards the IP control packets to the Trochilus server 140.1 via the connection 602.

The example Trochilus server 140.1 of FIG. 6A receives the IP control packets and selects one of the auxiliary routers 120.1-120.3 to forward the IP control packets. For example, in networks implemented with BGP advertisements for Network Layer Reachability Information, if the IP control packets include a destination address of 12.x.x.x and the auxiliary router 120.1 is assigned the IP address subspace in the range of 12.x.x.x to 14.x.x.x, then the Trochilus server 140.1 transmits the IP control packets to the auxiliary router 120.1 via a connection 604. Similarly, the auxiliary routers 120.2 and 120.3 are assigned IP address subspaces of different ranges. In other examples, in networks implemented with an Interior Gateway Protocol routing protocol like OSPF, the Trochilus server 140.1 ensures that all auxiliary routers 120.1-120.3 have the complete router-level topology information (e.g., Type 1 Latent Semantic Analysis (LSA) by transmitting the IP control packets to all of the auxiliary routers 120.1-120.3. However, network-reachability information (e.g., Type 2 LSA) may be filtered according to the auxiliary router 120.1-120.3 to which the control message and/or IP control packet is destined. Because the time-scale at which the control plane operates is longer than that of the data plane, the overhead of additional hops (between the router 120 and Trochilus server 140.1, as well as between the Trochilus server 140.1 and the routers 120.1-120.3) is acceptable.

Upon transmitting the IP control packets to the auxiliary router 120.1, the Trochilus server 140.1 updates static forwarding and/or routing tables within the router 120. Thus, when the router 120 receives IP data packets associated with the same destination IP address of the with the IP control packets, the router 120 statically forwards the IP data packets directly to the auxiliary router 120.1.

In response to receiving IP control packets, the auxiliary router 120.1 accesses routing and/or forwarding tables to determine an interface to the router 120 for transmitting the IP control packets. In the example of FIG. 6A, the auxiliary router 120.1 has a routing table that indicates IP packets with a destination address prefix of 12.x.x.x should be routed via interface A1 to the route 120, while IP packets with a destination address prefix of 13.x.x.x-14.x.x.x should be routed via interface B1 to the route 120. Because the IP control packets are routed to the appropriate interface in the route 120, the router 120 is able to statically forward the IP control packets to the appropriate destination (e.g., via interface A or B) without accessing its own routing and/or forwarding tables. Upon forwarding the IP control packets, a control path is established for any IP data packets associated with the IP control packets.

Despite the fact that the network is implemented by BGP or OSPF, the example auxiliary routers 120.1-120.3 maintain routing and/or forwarding tables for their assigned IP address region(s). Each of the forwarding and/or routing tables within the auxiliary routers 120.1-120.3 is smaller than the single routing and/or forwarding table that would be required by the router 120 under a conventional approach. As a result, the auxiliary routers 120.1-120.3 provide better scaling for network traffic. Additionally, when the average volume of network traffic surpasses the capacity of the three auxiliary routers 120.1-120.3, a fourth auxiliary router may be added to the router array.

Furthermore, the use of the auxiliary routers 120.1-120.3 may be optimized for current network conditions by the Trochilus server 140.1 deactivating one or more of the auxiliary routers 120.1-120.3 during less congested network times, and activating more auxiliary routers during more congested network times. When auxiliary routers 120.1-120.3 are deactivated, the IP address subspace of the deactivated auxiliary routers 120.1-120.3 may be distributed by the Trochilus server 140.1 to the remaining auxiliary routers 120.1-120.3. Likewise, when additional auxiliary routers are added and/or activated, the example Trochilus server 140.1 may decrease the amount of IP address subspace for each auxiliary route 120.1-120.3 and distribute the balance of IP address subspace to the newly added auxiliary router. The determination to activate and/or deactivate auxiliary routers 120.1-120.3 may be made by comparing one or more thresholds to current and/or predicted network traffic. The example Trochilus server 140.1 may include these thresholds, which may be defined by the service provider of FIG. 1.

FIG. 6B is a schematic illustration of the example Trochilus server 140.1 of FIG. 4 implementing the route splitting application 508 for IP data packets associated with the IP control packets routed in FIG. 6A. By routing the IP control packets and updating a forwarding table in the route 120, the Trochilus server 140.1 created the control path from the router 120 to the auxiliary route 120.1. As a result of this control path, the example in FIG. 6B shows the IP data packets are statically forwarded from the router 120 directly to the auxiliary route 120.1 without routing through the Trochilus server 140.1.

Upon receiving the IP data packets, the auxiliary route 120.1 accesses its routing and/or forwarding tables to determine the appropriate interface to route the IP data packets. The auxiliary route 120.1 transmits the IP data packets via the determined interface to the router 120 (e.g., A1 or B1). This interface subsequently determines the outgoing interface from route 120. It is an explicit goal of the Trochilus server 140.1 to ensure that no changes are necessary to external routers (e.g., route 120) nor the small ones (e.g., the auxiliary routers 120.1-120.3). The interfaces used preferable match the original scenario. For example, if the router 120 is connected to the rest of the network via interfaces A and B, then the auxiliary routers 120.1-120.3 are preferably logically connected in the same manner. Thus, auxiliary routers 120.1-120.3 are connected to the network via interfaces A and B and the addition of one or more other auxiliary router(s) will not change their interface arrangement. Additionally, the configuration of static routes for the router 120 can be performed by the Trochilus server 140.1.

Figure 7:
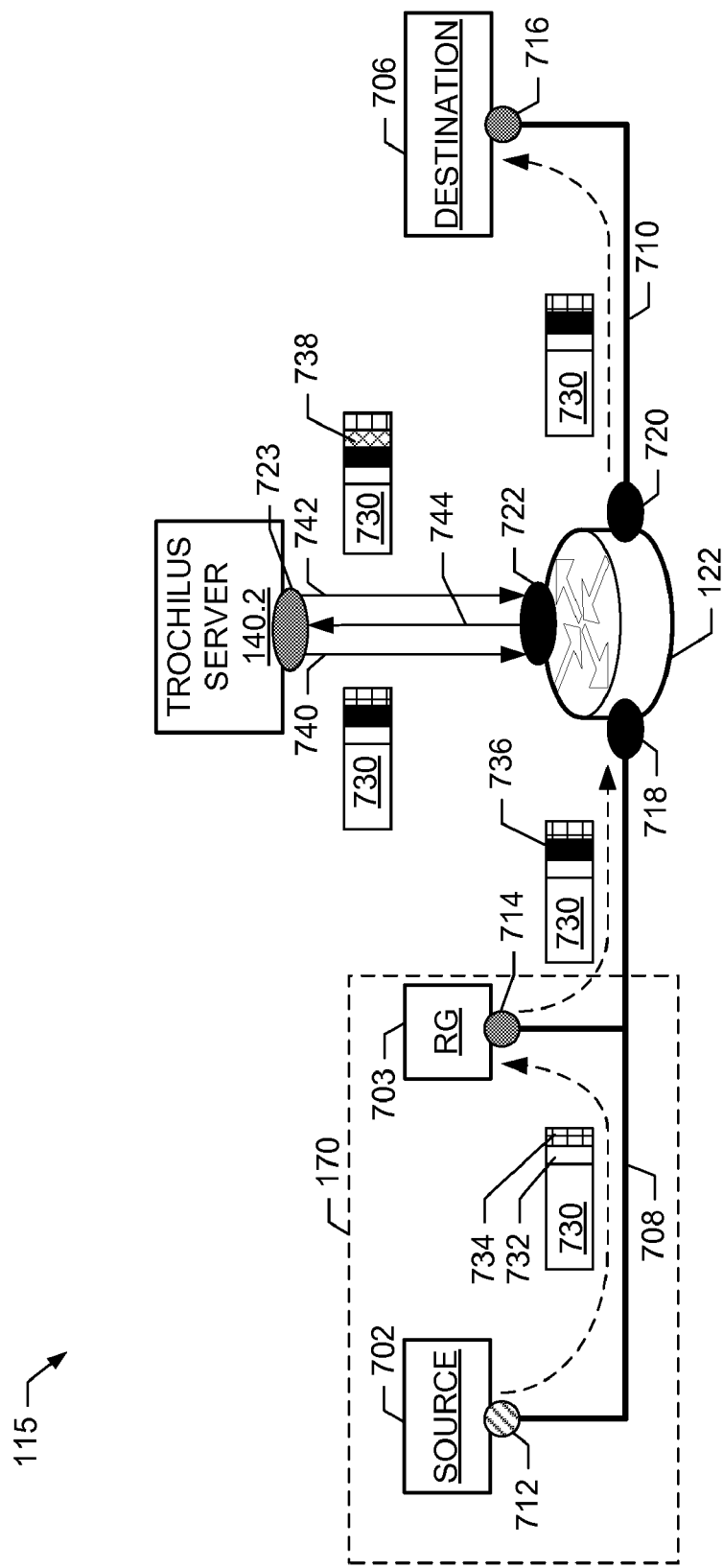
FIG. 7 is a schematic illustration of the packet-switched communication network of FIG. 1 showing IP packet flow to test and/or deploy an experimental protocol.

FIG. 7 is a schematic illustration of the packet-switched communication network 115 of FIG. 1 showing IP packet flow to test and/or deploy an experimental protocol N. The example packet-switched communication network 115 includes the network provider 170, the route 122, and the Trochilus server 140.2 of FIG. 1. The example packet-switched communication network 115 of FIG. 7 may be used to test, experiment, and/or deploy an experimental protocol, application, function, prototype network service, etc. The experimental protocol N tested in FIG. 7 is associated with a network layer N. As a result, only network elements within the packet-switched communication network 115 with an interface corresponding to the N network layer may receive and/or manipulate IP packets with an N protocol header.

The example packet-switched communication network 115 of FIG. 7 includes a first communication path 708 from a source 702 to the route 122 and a second communication path 710 from the route 122 to a destination 706. The communication paths 708 and 710 may be any type of communication path such as any of the communication paths described in FIG. 1 in conjunction with the packet-switched communication network 115. The source 702 is communicatively coupled to the first communication path 708 via an N interface 712 with a network stack that corresponds to the network layer N for implementing the experimental protocol N. The route 122 includes standard IP interfaces 718, 720, and 722 for receiving and/or transmitting IP packets having the IP protocol. The example Trochilus server 140.2 is communicatively coupled to the route 122. The Trochilus server 140.2 includes an N and IP interface 723 for receiving packets with IP protocol headers and/or packets with N protocol headers.

In the example packet-switched communication system 115, the example service provider 170 includes the source 702 for generating packets (e.g., a packet 730) for testing the experimental protocol N, and a RG 703 for transmitting the packets through the packet-switched communication network 115. The gateway includes an N and IP interface 714 for receiving packets with IP headers and/or N headers. Additionally, the packet-switch communication network 115 includes a destination 706 with an N and IP interface 716. The destination 706 may include another Trochilus server, another section of the service provider 170, and/or any computing device connected to the second communication path 710.

To initiate the test, experiment and/or deployment of the experimental protocol, the source 702 generates the packet 730 with a first header 734 associated with the Ethernet and a second header 732 associated with the network layer N. Because the packet 730 may include an experimental and/or non-production protocol upon generation and transmission from the source 702 and the route 122 is configured to receive and/or transmit packets with the IP protocol, the RG 703 inserts an IP shim header $IP_T$ 736 prior to transmitting the packet 730 to the route 122. The IP shim header $IP_T$ 736 includes the IP address of the Trochilus server 140.2 as a destination address. Upon adding the IP shim header $IP_T$ 736, the RG 703 transmits the packet 730 to the route 122 via the first communication path 708. The route 122 receives the packet 730 at the IP interface 718 and reads the information within the IP shim header $IP_T$ 736. The route 122 determines the destination address corresponds to the Trochilus server 140.2 and statically forwards the packet 730 to the Trochilus server 140.2 via the IP interface 722. The packet 730 is forwarded along a connection 744 to the N and IP interface 723 of the Trochilus server 140.2. Because the N and IP interface 723 includes an interface for the experimental protocol N, the example Trochilus server 140.2 is capable of determining and/or manipulating the data within the second header 732.

The example Trochilus server 140.2 of FIG. 7 receives the packet 730 and determines the packet 730 corresponds to the experimental protocol N. The Trochilus server 140.2 may analyze, manipulate, store, and/or modify any of the data within the packet 730 and/or within the headers 732-736 depending on the desired procedure for testing and/or deploying the experimental protocol N. Additionally, in the example of FIG. 7, the Trochilus server 140.2 inserts a tunneling header 738. The tunneling header 738 is a generic routing encapsulation (GRE) IP header for routing the packet 730 towards the destination 706 via a connection 742 to the IP interface 722 of the route 122. In other examples where the packet 730 is sent back to the source 702, the tunneling header 738 includes information for routing the packet 730 via a connection 740. Because the packet 730 is received via the connection 740, the route 122 statically forwards the packet 730 to the service provider 170 via the first communication path 708. Likewise, because the packet 730 is received via the connection 742, the route 122 statically forwards the IP packet to the destination 706 via the second communication path 710. Additionally, because the tunneling header 738 only pertains to routing within the route 122, the route 122 removes the tunneling header 738 as the packet 730 passes through the route 122.

The packet 730 in FIG. 7 travels along the second communication path 710 until it reaches the destination 706 via the N and IP interface 716. The destination 706 receives the packet 730 and determines the packet 730 is a non-production packet corresponding to the experimental protocol N. As a result, the destination 706 may analyze, manipulate, store, and/or modify any of the data within the packet 730 and/or within the headers 732-736. Furthermore, the destination 730 may forward the packet 730 to another destination (not shown) such as another Trochilus server 140.2 within the packet-switched communication network 115.

Figure 8:
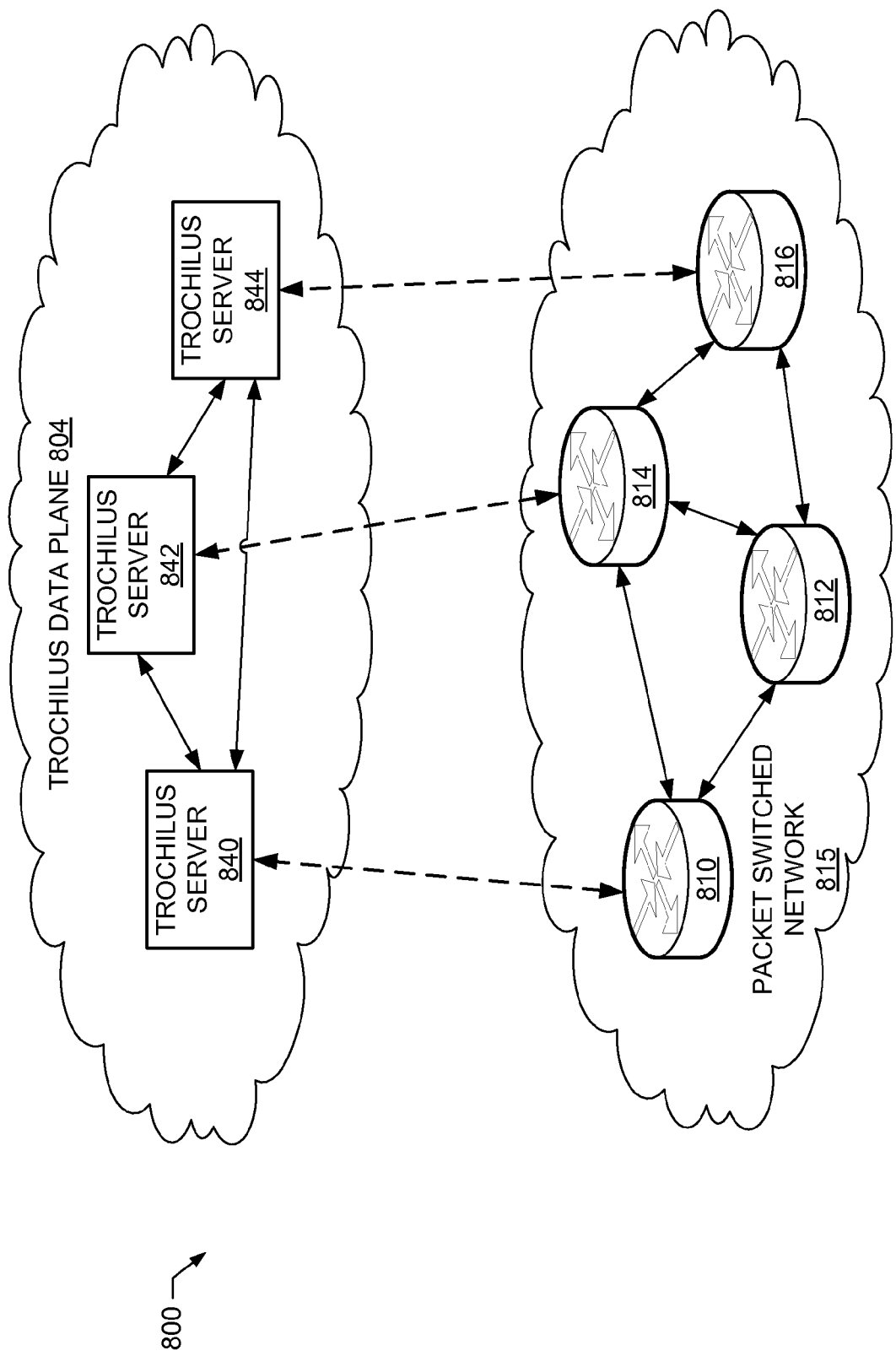
FIG. 8 is a schematic illustration of the packet-switched communication network of FIG. 1 including Trochilus servers implementing a network-wide data plane configuration.

FIG. 8 is a schematic illustration of a packet-switched communication network 815 including Trochilus servers 840-844 implemented in a network-wide Trochilus data plane 804. The packet-switched communication network 815 and the Trochilus data plane 804 are part of a communication system 800 similar to the communication system 100 of FIG. 1. The packet-switched communication network 815 includes routers 810-816 and the Trochilus data plane 804 includes Trochilus servers 840-844. In the example of FIG. 8, the Trochilus servers 840-844 are communicatively coupled to respective routers 810, 814, and 816 in the same manner as described in connection with FIG. 1. The Trochilus servers 840-844 are implemented in the Trochilus data plane 804 for network monitoring, traffic routing, testing, and/or experimental protocol deployment. Additionally, the Trochilus data plane 804 may include a network provider and/or connections to a network provider that controls the Trochilus servers 840-844. Alternatively, the Trochilus servers 840-844 may operate without the need for external control in the Trochilus data plane 804.

The Trochilus data plane 804 functions as a medium for the Trochilus servers 840-844 to communicate and route network traffic. This provides greater spatial resolution of the entire packet-switched communication network 815. For example, if the Trochilus servers 840-844 deploy an experimental prototype, the more routers monitored by Trochilus servers 840-844 the more information will be collected regarding the performance of the protocol under different conditions experienced by the routers 810-816. Additionally, the Trochilus data plane 804 enables better network testing by enabling transmission of packets to most, if not all, parts of the packet-switched communication network 815 thereby enabling a network provider to ensure most, if not all, sections of the network are tested. Through network wide experimentation and prototyping, the Trochilus data plane 804 provides a network provider production level test results without the associated risks. This enables a better understanding of new technologies such as experimental forwarding tables, and/or routing protocols prior to commercial release. As a result, the service provider can make implementation decisions with a better understanding of how changes or updates in the forwarding tables and/or routing protocols will affect network efficiency and traffic management without needing to update production router software.

Furthermore, the Trochilus data plane 804 provides a framework for route tracing, network testing, and/or monitoring specific IP packets. For example, by having Trochilus servers 840-844 coupled to routers across the packet-switched communication network 815, the service provider is able to monitor the time, route, and number of hops IP packets take from a source IP address to a destination IP address. In another example, the Trochilus data plane 804 enables route splitting (similar to the route splitting application 508 of FIG. 5) and reduction in the size of the forwarding tables of production routers by utilizing the Trochilus servers 840-844 to share and distribute network traffic and/or IP packets amongst themselves and/or to other production routers. Such an approach reduces the processing and routing performed by the routers 810-816 in the packet-switched communication network 815. Additionally or alternatively, the example topology of FIG. 8 enables routing around trouble areas (e.g., broken routers, severed cables, high traffic areas, etc.) within the packet-switched communication network 815.

Figure 9:
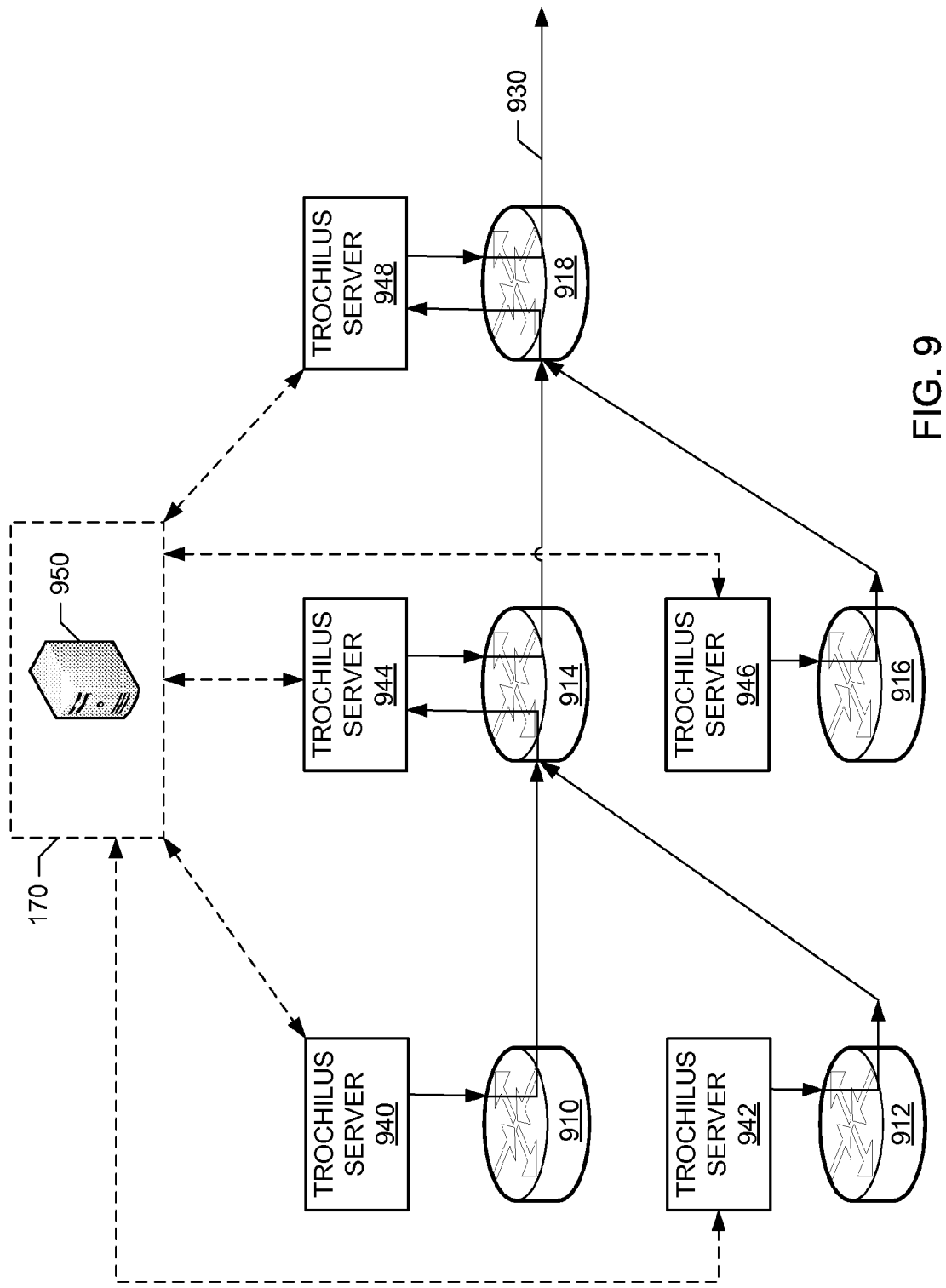
FIG. 9 is a schematic illustration of example Trochilus servers such as that shown in FIG. 4 implementing a route tracing network monitoring application.

FIG. 9 is a schematic illustration of example Trochilus servers 940-948 implementing a route tracing network monitoring application. Each of the Trochilus servers 940-948 are communicatively coupled to respective production routers 910-918. Additionally, each of the example Trochilus servers are communicatively coupled to the service provider 170 in a similar manner as described in connection with FIG. 1. The service provider 170 includes a control processing server 950 for accumulating and/or analyzing network information gathered by the Trochilus servers 940-948. The example Trochilus servers 940-948 are included within a network similar to the packet-switched communication network 115 of FIG. 1. The example Trochilus servers 940-948 of FIG. 9 are located within the network at non-edge locations for implementing a network monitoring application. In other examples, some of the Trochilus servers 940-948 may be located at network edge locations.

The example in FIG. 9 shows the Trochilus servers 940-948 implementing a network monitoring application through the use of trace rate limiting which reduces bandwidth consumption of routers (e.g., the router 910-918) closer to a destination (e.g., a destination 930). Network traces may include probe packets of data associated with the IP protocol and/or any other experimental and/or product network monitoring application. In current network traces, the traces aggregate as they approach a destination such as, for example, the destination 930. Using the Trochilus servers 940-948, the traces are received at the next hop Trochilus server and processed. Then, instead of forwarding the received traces, the Trochilus server sends a single trace to the next hop router. For example, the Trochilus server 944 received traces for monitoring network performance from Trochilus servers 910 and 912. The Trochilus server 944 processes the two received traces and stores the monitoring data from the traces. The Trochilus server 944 then sends a single trace to the next hop router 918 (e.g., the router coupled to Trochilus server 948). In this manner, the destination 930 receives a single trace from Trochilus server 948 instead of the five traces prior art systems would require.

By transmitting network traces and/or probe packets only one hop, the effect of changes in the control plane implemented by the routers 910-918 can be determined. Changes in the control plane can be determined from the probe packets by observing the probe packets as they traverse the network in regards to a specific aspect of network dynamics, namely, network reconvergence. More precisely, the route trace monitoring shown in FIG. 9 provides information as to when and which routers 910-918 have updated their forwarding tables. Commonly available trace route tools rely on the expiration of a probe packet's Time to Live (TTL) and the Internet Control Message Protocol response from a corresponding router. Because probe packets with expiring TTLs are not normally processed, they are usually handled by the router processor via a slower path than normal IP traffic. For high-resolution tracing, probe packets are sent at high rates, which will result in either the route processor having fewer cycles for processing important routing updates (which delays network convergence times) or rate-limiting that is performed during periods of high processor activity, in which case the probe packet will be silently dropped when it is needed the most.

The timing information returned by the probe packet route is that of the round-trip time to the router 910-940 at which the probe terminated. Thus, depending on the network conditions and path, such information may have too much variance to be useful (for example, round-trip time for transcontinental United States packets is about 100 milliseconds). In current backbone networks, the high traffic volume requires enormous processing capabilities to deep-inspect every probe packet. Gigascope is an example of a passive sniffer that provides focused observation of passing packets. A limitation of Gigascope is that it needs to be deployed in as many locations as possible to provide the required spatial resolution. Since Gigascope operates at the link-layer by tapping into the optical link, providing per-physical link coverage cannot scale easily. Another limitation is that, because Gigascope is passive, its utility as a tracing tool is very much dependent on the traffic it is observing. Thus, flows (either single or aggregated) that include packets interleaved at greater than 20 ms cannot be used if the tool is to provide resolutions less than 10 ms. However, the Trochilus servers 940-948 of FIG. 9 implement a tracing (e.g., probe packet) tool application periodically by sending probe packets (e.g., with just the IP header and no payload) addressed to different destinations.

For example, depending on the forwarding table entries, the probe packets are forwarded to the corresponding next-hop router 914, which subsequently passes them to its attached Trochilus server 944. Using the source and destination IP addresses, the Trochilus server 944 infers the corresponding forwarding table entry in the previous hop router. By storing the last seen packet's address information on a per-last-hop-router (there are "r" number of them) and per-destination (there are "d" number of them) basis, changes in the form of new entries can be used to trigger reports of routing changes, and requires O(rd) states. Assuming IPv4 (Internet Protocol version 4) addresses of 4 bytes each, 10 neighboring routers and 100 major network points-of-presence serving as destinations, this amounts to approximately 8 Kbytes of state.

With regards to bandwidth consumption, if a resolution of about 10 ms is required and each packet has a size of 100 bytes, the maximum bandwidth required of an outgoing link will be on the order of 8 Mbps. Furthermore, because information from the Trochilus server 944 is used offline in the central processing server 950, reports detailing changes in routing state can be batched and sent to a predetermined location, and can also be rate-limited to smooth bandwidth consumption spikes.

Using network-layer hooks provided by Trochilus servers 940-948 and probe packets, the impact of control plane changes on the data-plane can be observed. Furthermore, link-level characteristics, such as congestion and latency, can be inferred. Changes in the control plane (such as a link coming up or down) impact multiple routers in the network. The Trochilus servers 940-948 enable interception of probe packets at the immediate next hop, hence providing high spatial resolution. Also, removal of the probe packet at the next hop eliminates the aggregation effect, thereby improving scalability.

In some examples the Trochilus servers 940-948 send probe packets from every network router 910-918, towards all destinations (e.g., the destination 930). These probe packets are forwarded by their corresponding routers 910-918, and intercepted at the next-hop routers 910-918 using the Trochilus servers 940-948. Inferences are made concerning router forwarding tables by observing the packets' sources at the next hop routers 910-918. Interception of packets at the next hop enables high spatial resolution monitoring, and their removal eliminates the aggregation effect, hence improving scalability.

The Trochilus servers 940-948 enable network operators (e.g., the service provider 170) to pinpoint problematic routers and links in the network. This reduces troubleshooting times and hence improves network reliability. With high temporal resolution, observations of network changes, such as fast recovery after failures, can be made. Furthermore, the Trochilus servers 940-948 enable local processing, and preferably only send changes and events of importance to the central processing server 950, thereby reducing the bandwidth required. The in-network component of the Trochilus servers 940-948 functions to gather local data-plane information, disseminate the gathered information with best-effort reliability amongst other Trochilus servers 940-948, and serve as repositories for applications within the central processing server 950 to retrieve and process data.

With the need to provide increasingly reliable end-to-end network communication, near real-time understanding of network dynamics at high temporal and spatial resolutions is useful for rapid troubleshooting and recovery. These requirements can be divided into two parts including near real time and high temporal/spatial resolution. In near real time, the amount of information generated by network elements can potentially be large. Rather than transmitting the information as-is from the Trochilus servers 940-948 to the central processing server 950, thereby consuming bandwidth and resulting in large processing times as well as significant storage demands at the central processing server 950, pre-processing can be performed in the Trochilus servers 940-948 before transmission. In high temporal and spatial resolution, end-to-end paths may change, either in quality or the routes taken, due to events occurring at different points within the network. Solutions at the network edge are associated with latency incurred from the observation points to the event sources, as well as lack of knowledge of the network state, which is especially true during link failures and route re-convergence.

The example Trochilus servers 940-948 of FIG. 9 meet the above two requirements. Because the Trochilus servers 940-948 reside in-network, they enable pre-processing before long-distance transmission, and also reduce the delay between event occurrence and observation. The example Trochilus servers 940-948 enable a more complete picture of the network by monitoring the different control planes and the data plane. Monitoring the data plane is especially important since changes in the control planes ultimately impact the data plane, the data plane can fail independently of the control planes, and observations of the data plane, such as latency and loss, reveal more about the end-user experience. The example Trochilus servers 940-948 monitor the impact of control planes on data. For example, link weight changes can cause flows to traverse different paths. To observe this effect, the example Trochilus servers 940-948 utilize existing control planes (and hence use of IP addressing and routing).

On the other hand, since high spatial resolution views are desired, the IP packets generated and transmitted by the Trochilus servers 940-948 should be detected soon (in terms of space) after transmission, for instance, at the first hop router 910-918. The Trochilus servers 940-948 enable interception of probe and/or IP packets while reusing the existing control plane. A dense network of Trochilus servers 940-948 ensures high spatial resolution, and controlled active probes provide consistent temporal resolution.

Upon collecting and analyzing the probe packets, the Trochilus servers 140-148 transmit the probe packet data to the central processing server 950. The example central processing server 950 processes the probe packet data based on end-user requirements. For a route-change monitoring application, next-hop data can be pieced together to obtain per-destination network-wide routes. For example, the central processing server 950 may piece net-hop information between the routers 910 and 914 and net-hop information between the routers 914 and 918 to determine the performance of the network communication path from the router 910 to the router 918. From the collected probe packet data, the central processing server 950 can determine from the routers 910-918 routing table information, routing table changes, network state, any changes to the network state, network and/or router reliability, network and/or router quality, network and/or router performance, network congestion, and/or one or more trouble areas within the network. End-users (e.g., the network provider 170) may use a web-interface to view processed data produced by the application servers.

One-hop information (i.e., the route from router 912 to router 914) is inferred via probes sent at intervals necessary to meet application requirements. For example, a route change detection granularity of 100 ms will need probes to be sent every 50 ms. On the other hand, link capacity can be determined via packet pairs including two packets transmitted back to back.

For example, the trace of the path taken by a probe packet begins at the source Trochilus server 942. Based on the destination IP address (e.g., the destination 930) trace path (which is not necessarily the address of the next-hop Trochilus server), the probe packet is forwarded to the neighboring router 914. At the router 914, the packet is identified as residing within the Trochilus server domain (e.g., by using pre-defined source IP addresses), and statically forwarded to the Trochilus server 944. From data carried within the payload of the probe packet, such as the source identifier and timestamp, the Trochilus server 944 can infer information pertaining to routing state and link latency. Additionally, to ensure fast dissemination and non-reliance on routing, the Trochilus server 944 broadcasts information throughout the network, and avoids repeated flooding through the use of sequence numbers to detect duplicate probe packets.

From the point of view of the example Trochilus servers 940-948 of FIG. 9, no explicit knowledge of next-hop neighbors is used when sending probe packets. Specifically, each node does not maintain a neighbor table and/or does not send periodic keep-alive messages. These probe packets are sent to pre-determined destinations which are statically configured, and previous hops are inferred upon reception of the probes.

Dependence on and maintenance of neighbor information can incur additional delay because it must react to the very routing changes it is attempting to detect, and increases the overall complexity. Since network events are likely to be bursty (for example, a link failure may trigger multiple "destination unreachable" messages), dissemination of event notifications may temporarily consume excessive bandwidth and affect measurements of different network states. The example Trochilus servers 940-948 discussed herein minimizes this effect by piggy-backing notification messages on probe packets, hence rate-limiting them, at the expense of increasing dissemination delay.

With regards to reliability, the dissemination mechanism implements best-effort transmission and lazy recovery, in the sense that attempts to detect and recover missing data are initiated only upon request by applications in the Trochilus servers 940-948. Similar to information broadcasts, recovery requests are flooded and cached to eliminate duplicates. Furthermore, network event information, which has been gathered in a broadcast, best-effort manner, can be retrieved via a simple interface supported by any Trochilus server 940-948.

Applications at the Trochilus servers 940-948 gather local data-plane information and process the information to provide network-wide views that meet end-user requirements. An example generic interface exported by in-network Trochilus servers 940-948 and applications enabling the polling and/or pushing of data is shown in the following example code.

```
Trochilus server
    get_data(data_type, next_hop, start_time,
        end_time, start_seqno, end_seqno)
    set_notify(data_type, next_hop)
Application
    put_data(data_type, next_hop, start_time,
        end_time, start_seqno, end_seqno)
```

In an example, an application on the Trochilus server 944 capturing routing changes in the network may piece together the knowledge of a flow that previously traversed the router 910 to the router 914 and is now traversing the router 912 to the router 914. Since the underlying in-network Trochilus servers 940-948 disseminate network event information to all other Trochilus servers, an application on the Trochilus server 944 needs only communicate with just one other Trochilus server. This increases the likelihood of being able to retrieve troubleshooting data in the event of multiple irrecoverable network failures. The application on the Trochilus servers 940-948 hosts a web interface to enable end-user interaction via browsers.

Examples of the changes made to router configurations include modifications to interfaces, access-lists, and route-maps. Each interface configuration requires a single line indicating the route-map to use, which specifies the access list defining matching packets, and also the next-hop node to which matched packets are forwarded. By identifying packets residing in the Trochilus server domain using their source IP address, the number of configuration lines required in the access-list is constant. In turn, together with usage of a single Trochilus server 940-948 as the next hop, the number of configuration lines required in the route-map is also constant.

The kind of processing employed is dependent on the aspect of the data plane being monitored. Route change monitoring may detect incoming probes (assuming that multiplexing of application packets takes place at a higher layer, and that the router, therefore, only needs to distinguish between Trochilus and non-Trochilus packets) previously not sent from the corresponding neighbor. Such a change in received packets indicates that the forwarding information base of the previous hop router has changed (ignoring initialization). In addition, probes are also sent at intervals necessary to meet application requirements. For example, if routing changes are to be detected within 100 ms, then probe packets should be sent at intervals of 50 ms.

Sockets of type SOCK PACKET are used when transmitting outgoing probe packets. Unlike SOCK RAW sockets, link headers must be constructed in addition to IP headers before transmission. Another difference is the bypassing of the network routing table, which is consistent with the need to build link headers since this implies that the outgoing interface has already been determined.

The central processing server 950 retrieves locally generated data plane information from the Trochilus servers 940-948 and pieces it together to obtain the global network view. Using the interfaces, the application begins by retrieving the current network state as well as the history of changes using a get data function. Next, future events are pushed to the server by notifying the Trochilus servers 940-948. Using the example of route change detection, new network topologies are generated upon reception of each event and displayed in graphical form, thereby simplifying the detection and analysis of changes. These topologies are subsequently made available via a web interface for ease of usage.

FIGS. 10, 11A, 11B, 11C and 12 are flowcharts representative of example machine-accessible instructions that may be carried out to implement the example Trochilus servers 140.1-140.7 of FIGS. 1 and/or 4. The example machine-accessible instructions of other suitable processing device. For example, the example machine-accessible instructions of FIGS. 10, 11A, 11B, 11C and/or 12 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium which can be used to store program code and/or instructions in the form of machine-accessible instructions or data structures, and which can be accessed by a processor, a general-purpose or special-purpose computer, or other machine with a processor (e.g., the example processor platform 1300 discussed below in connection with FIG. 13). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular functions. Alternatively, some or all of the example machine-accessible instructions of FIGS. 10, 11A, 11B, 11C and/or 12 may be implemented using any combination(s) of ASIC(s), PLD(s), FPLD(s), discrete logic, hardware, firmware, etc. Also, some or all of the example machine-accessible instructions of FIGS. 10, 11A, 11B, 11C and/or 12 may instead be implemented manually or as any combination of any of the foregoing techniques, for example, any combination of firmware, software, discrete logic and/or hardware. Further, many other methods of implementing the example operations of FIGS. 10, 11A, 11B, 11C and/or 12 may be employed. For example, the order of execution of the blocks described may be changed, and/or one or more of the blocks described may be changed, eliminated, sub-divided, or combined. Additionally, any or all of the example machine-accessible instructions of FIGS. 10, 11A, 11B, 11C and/or 12 may be carried out sequentially and/or carried out in parallel by, for example, separate processing threads, processors, devices, discrete logic, circuits, etc.

Figure 10:
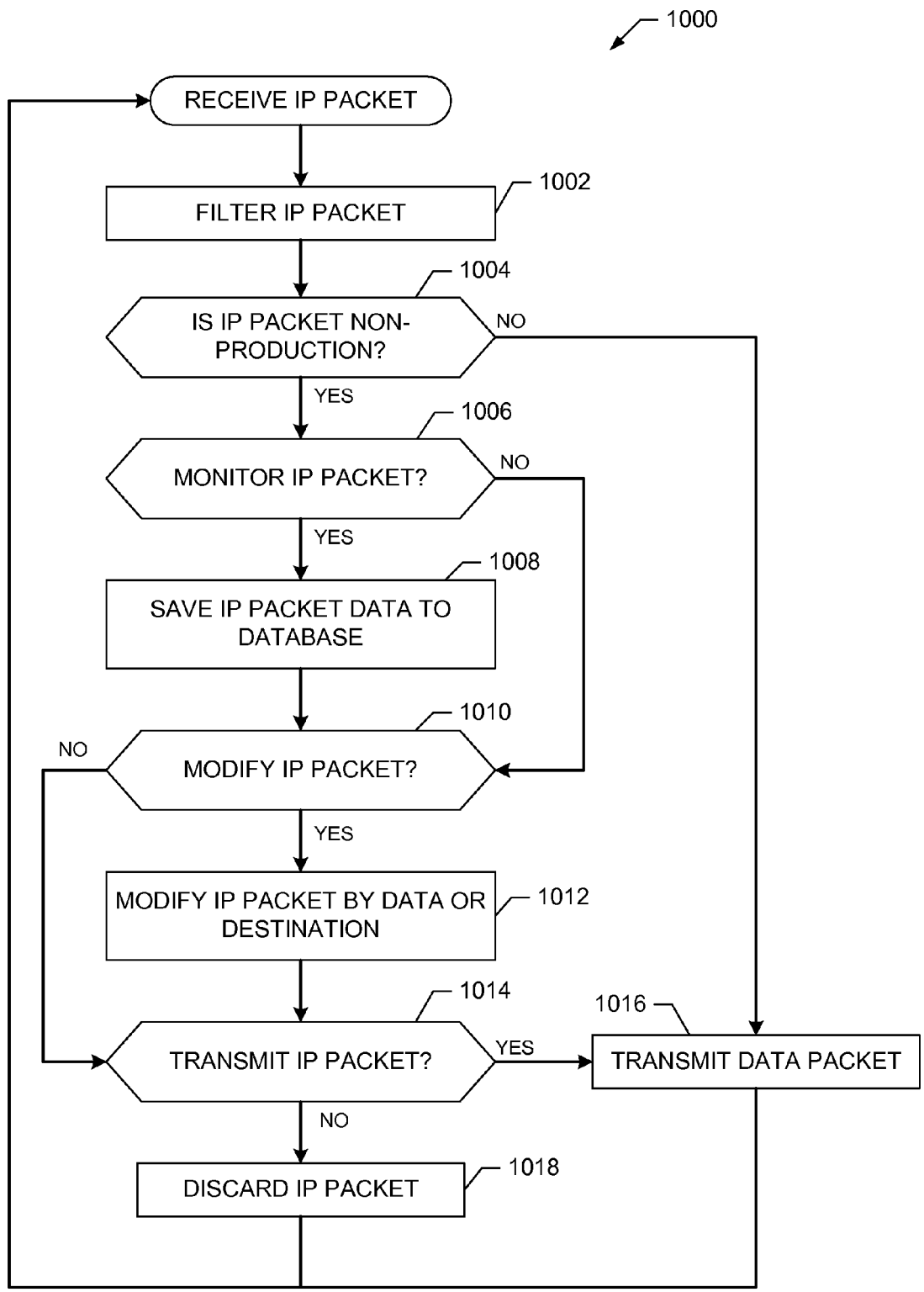

The example machine-accessible instructions 1000 of FIG. 10 begin when the Trochilus server 140.1 receives an IP packet from a communicatively coupled router (e.g., route 120). The received IP packet is filtered in the Trochilus server 140.1 (block 1002) by determining if the received IP packet is a non-production IP packet (block 1004). If the IP packet is not a non-production IP packet (e.g., the packet is a production IP packet), the Trochilus server 140.1 transmits the IP packet back to the communicatively coupled router (block 1016). If the IP packet is a non-production IP packet, the Trochilus server 140.1 determines if the IP packet includes network monitoring information (block 1006). To make the determination at block 1006, the Trochilus server 140.1 may check a type of service field and/or a protocol field in the IP header of the IP packet. If the IP packet does not contain network monitoring information (block 1006), the Trochilus server 140.1 determines if information within the IP packet should be modified according to criteria specified by a network provider (block 1010).

If the Trochilus server 140.1 determines the IP packet includes network monitoring data (block 1006), the Trochilus server 140.1 saves the monitoring data within the IP packet to a performance database (block 1008). The network monitoring data may include, for example, the time for the IP packet to traverse the network from a source IP address to the destination Trochilus server 140.1, the number of hops the IP packet made, the route of the IP packet to reach the Trochilus server 140.1, and/or any other network performance and/or network routing information.

Once the network monitoring data is saved from the IP packet (block 1008) or if no monitoring data is present (block 1006), the Trochilus server 140.1 determines if the IP packet should be modified (block 1010). The Trochilus server 140.1 may use IP headers in the IP packet and/or other criteria specified by a network provider to determine if the IP packet is to be modified. If the IP packet is not to be modified (block 1010), the Trochilus server 140.1 determines if the IP packet is to be transmitted back to the network (block 1014). If the IP packet is to be modified (block 1010), the Trochilus server 140.1 uses information within the IP packet IP header and/or conditions specified by a network provider to modify fields within the IP packet (block 1012). The fields for modification may include the source IP address field, the destination IP address field, a type of service field, a time to live field, a protocol field, and/or a data field. The Trochilus server 140.1 modifies the IP packet in cases where the IP packet is to be routed to a different destination for protocol prototyping and/or network monitoring. Additionally, the IP packet may be modified for route splitting applications. Upon modifying the IP packet (block 1014) or if no modification is to occur (block 1010), the Trochilus server 140.1 determines if the modified IP packet is to be transmitted to the network (block 1014).

The Trochilus server 140.1 determines if the IP packet is to be transmitted by the destination IP address field (block 1014). If the field matches the address of the Trochilus server 140.1 (block 1014), the IP packet has reached its destination and the IP packet is discarded (block 1018). Alternatively, if the destination IP address does not match the IP address of the Trochilus server 140.1 (block 1014), the Trochilus server 140.1 transmits the IP packet (block 1016). The Trochilus server 140.1 transmits the IP packet by sending the IP packet to a communicatively coupled router (e.g., route 120). In a route splitting application, the IP packet may be sent to an auxiliary router within the coupled router, which then forwards the IP packet to the next hop. The router uses dynamic forwarding tables to determine the next hop for the IP packet or the router uses static forwarding and forwards the received IP packet to the next hop specified by the Trochilus server 140.1. Once the IP packet is transmitted from the Trochilus server 140.1 (block 1016) or the IP packet is discarded (block 1018), the example instructions 1000 begin again by processing another IP packet.

Figure 11A:
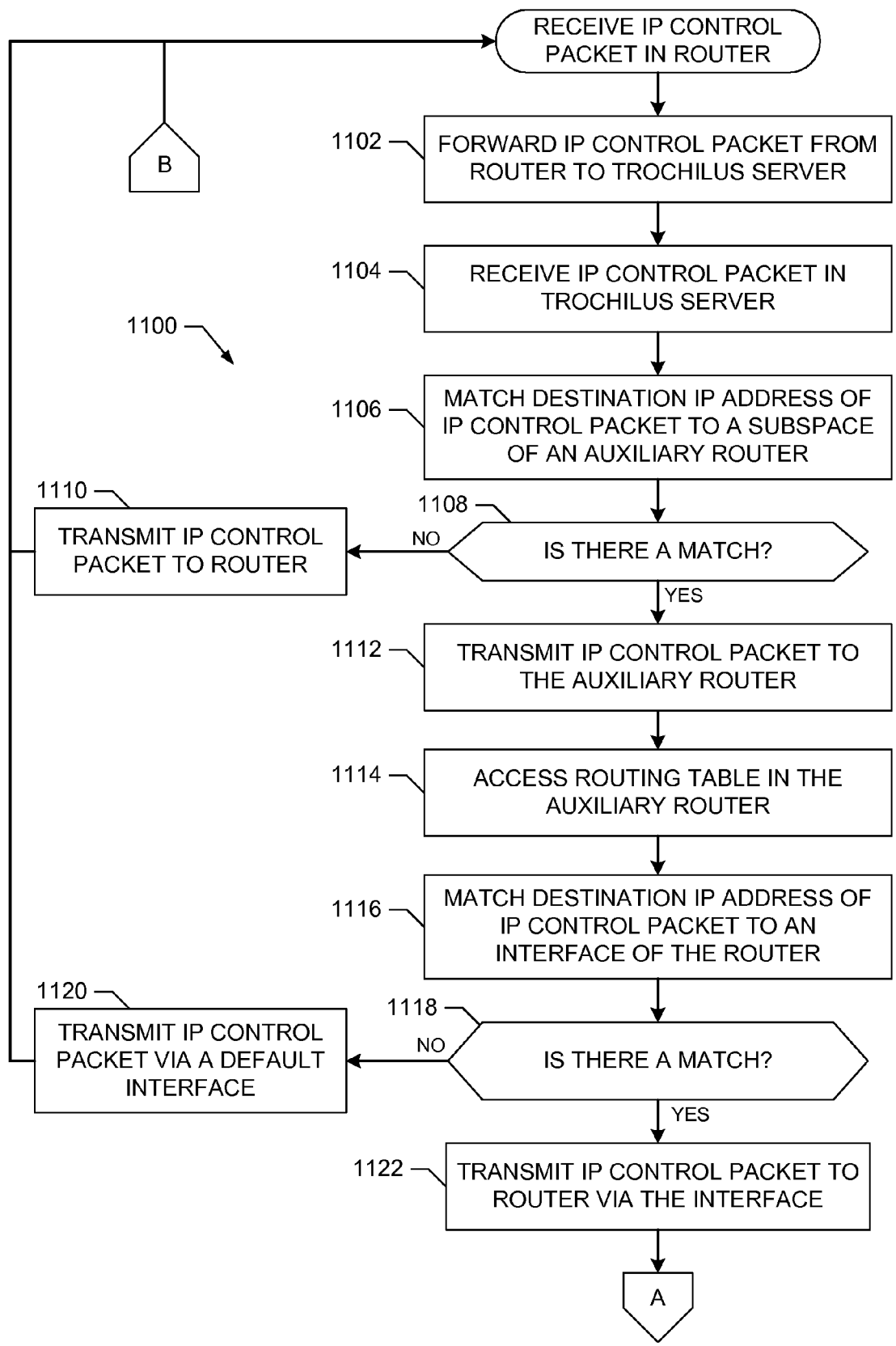

The example machine-accessible instructions 1100 of FIG. 11A begin when a router receives IP control packets from a source. The source may include a Trochilus server 140.1-140.7, one of the routers 120-132 of FIG. 1, and/or any other device capable of generating IP control packets. Based on a destination IP address within the IP control packets, the router statically forwards the IP control packet to a communicatively coupled Trochilus server (block 1102).

The Trochilus server receives the IP control packet and determines the destination address within the IP control packet (block 1104). The Trochilus server then matches the destination IP address to an IP address subspace of an auxiliary router within a router array (block 1106). The Trochilus server may match the destination IP address by determining which IP address subspace range corresponds to the destination IP address and then identifies the auxiliary router associated with that range. If the Trochilus server cannot match the destination IP address to an IP address subspace (block 1108), the Trochilus server transmits the IP control packet back to the router for routing and transmission to the destination (block 1110). The example machine-accessible instructions 1100 begin again and process another IP control packet.

However, if the Trochilus server is able to match the destination IP address within the IP control packets to an IP address subspace (block 1108), the Trochilus server 1112 transmits the IP control packets to the auxiliary router associated with the matched IP subspace (block 1112). Additionally, the Trochilus server may update routing and/or forwarding tables within the router such that any IP data packets associated with the IP control packets are statistically forwarded to the auxiliary router. In response to receiving the IP control packets, the auxiliary router accesses a packet routing and/or forwarding table (block 1114). The routing and/or forwarding table may be included within the auxiliary router or alternatively, within the Trochilus server. The packet routing and/or forwarding table includes a listing of interfaces within the router and a range of IP addresses associated to each interface. The packet routing and/or forwarding table may be defined by a service provider, the router, and/or the Trochilus server. The auxiliary router determines if the destination address within the received IP control packets matches a range of IP addresses associated with an interface (block 1116). If there is not a match (block 1118), the auxiliary router transmits the IP control packets to a designated default interface in the router for transmission to the destination (block 1120). The example machine-accessible instructions 1110 then begin again and process another IP control packet.

Alternatively, if the auxiliary router is able to match the destination address to a range of IP addresses (block 1118), the auxiliary router transmits the IP control packets to the interface corresponding to the matching range of IP addresses (block 1122). The example machine-accessible instructions 1100 continue in FIG. 11B when, upon receiving the IP control packets via the interface, the router statically forwards the IP control packets to the destination (block 1124). At this point, a control path is established for any IP data packets associated with the IP control packets (block 1126). Then, the example machine-accessible instructions 1100 of FIGS. 11A and 11B begin again and process another IP control packet.

The example machine-accessible instructions 1150 of FIG. 11C begin when the router described above in connection with FIGS. 11A and 11B receives IP data packets associated with the IP control packets (block 1152). The control path is established (block 1126) in FIG. 11B, by the Trochilus server updating the forwarding tables within the router. In the machine-accessible instructions 1150 of FIG. 11C, the router determines if a control path is established for the IP data packets (block 1154). The router may determine if a control path is established by accessing a destination IP address within the IP data packets and examining if that destination IP address is included within routing and/or forwarding tables for static forwarding to an auxiliary router. If a control path is not established (block 1154), the router buffers the IP data packets as it continues to receive any additional IP data packets with the same destination IP address (block 1152).

However, if the path is established (block 1154), the router forwards the IP data packets to the auxiliary router (block 1156). The auxiliary router (which may also be referred to as a "sub-router") receivers the IP data packets and accesses a packet routing and/or forwarding table to determine an interface within the router for routing the IP data packets through (block 1158). The packet routing and/or forwarding table includes a listing of interfaces within the router and a range of IP addresses associated with each interface. Upon matching an interface to the IP data packets, the auxiliary router transmits the IP data packets to the router via the interface (block 1160). In response to receiving the IP data packets via the interface, the router statically forwards the IP data packets to the destination specified by the interface (block 1162) and the example machine-accessible instructions 1150 begin again and process another IP data packet.

Figure 12:
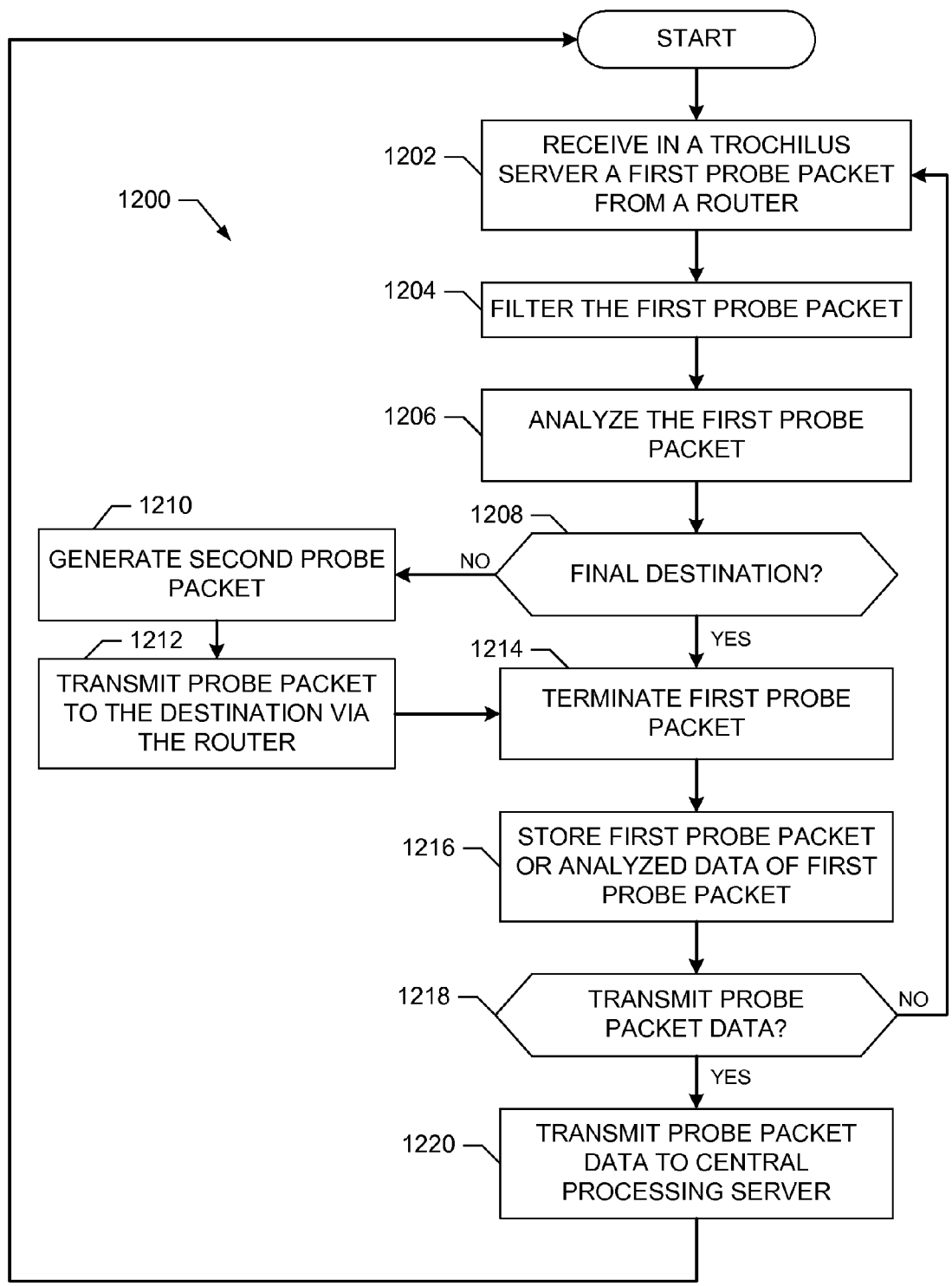

The example machine-accessible instructions 1200 of FIG. 12 begin when a Trochilus server receives a first probe packet statically forwarded from a communicatively coupled router (block 1202). The probe packet had been transmitted to the router from another Trochilus server that is one-hop away in a network from the router. In other examples, a source controlled by a network provider may have transmitted the probe packet. In response to receiving the first probe packet, the Trochilus server filters the first probe packet (block 1204). The Trochilus server may filter by protocol type included within the first probe packet.

The Trochilus server then analyzes the first probe packet (block 1206). To analyze the first probe packet, the first probe packet may include, for example, a source identifier, a timestamp for when the first probe packet was generated, information pertaining to a routing state of the communication path the probe packet traveled to reach the Trochilus server, a protocol type, and/or a link latency. The data within the first probe packet may be analyzed by determining a time to route the first probe packet to the router, a quality of the communication path, a link latency of the communication path, a performance of the communication path, the protocol quality, the protocol performance, and/or the protocol reliability. Additionally, the Trochilus server may analyze other received probe packets and/or communication(s) with other Trochilus servers while analyzing the first probe packet.

Upon analyzing the first probe packet (block 1206), the Trochilus server determines if the final destination of the first probe packet is the Trochilus server by accessing a destination IP address field (block 1208). If the Trochilus server is not the final destination, the Trochilus server generates a second probe packet that includes some of the source information include within the first probe packet (block 1210). The Trochilus server then transmits the second probe packet towards the destination via the router (block 1212). In traveling to the final destination, the second probe packet will be intercepted within the next one-hop Trochilus server for analysis preformed similarly to or identical to the example machine-accessible instructions 1200 of FIG. 12.

However, if the Trochilus server is the final destination of the first probe packet (block 1208), the Trochilus server terminates the first probe packet by not generating a second probe packet (block 1214). The Trochilus server then stores the first probe packet and/or the analyzed data of the first probe packet (block 1216). The Trochilus server determines if the stored probe packet data should be transmitted to a control processing server within a network provider (block 1218). Alternatively, the central processing server may request the probe packet data from the Trochilus server. If the probe packet data should not yet be transmitted to the central processing server (block 1218), the Trochilus server continues receiving probe packets for analysis (block 1202). However, if the Trochilus server is to transmit the probe packet data, the Trochilus server sends the probe packet data to the central processing server for further network analysis and the example machine-accessible instructions 1200 loop back and process another probe packet.

Figure 13:
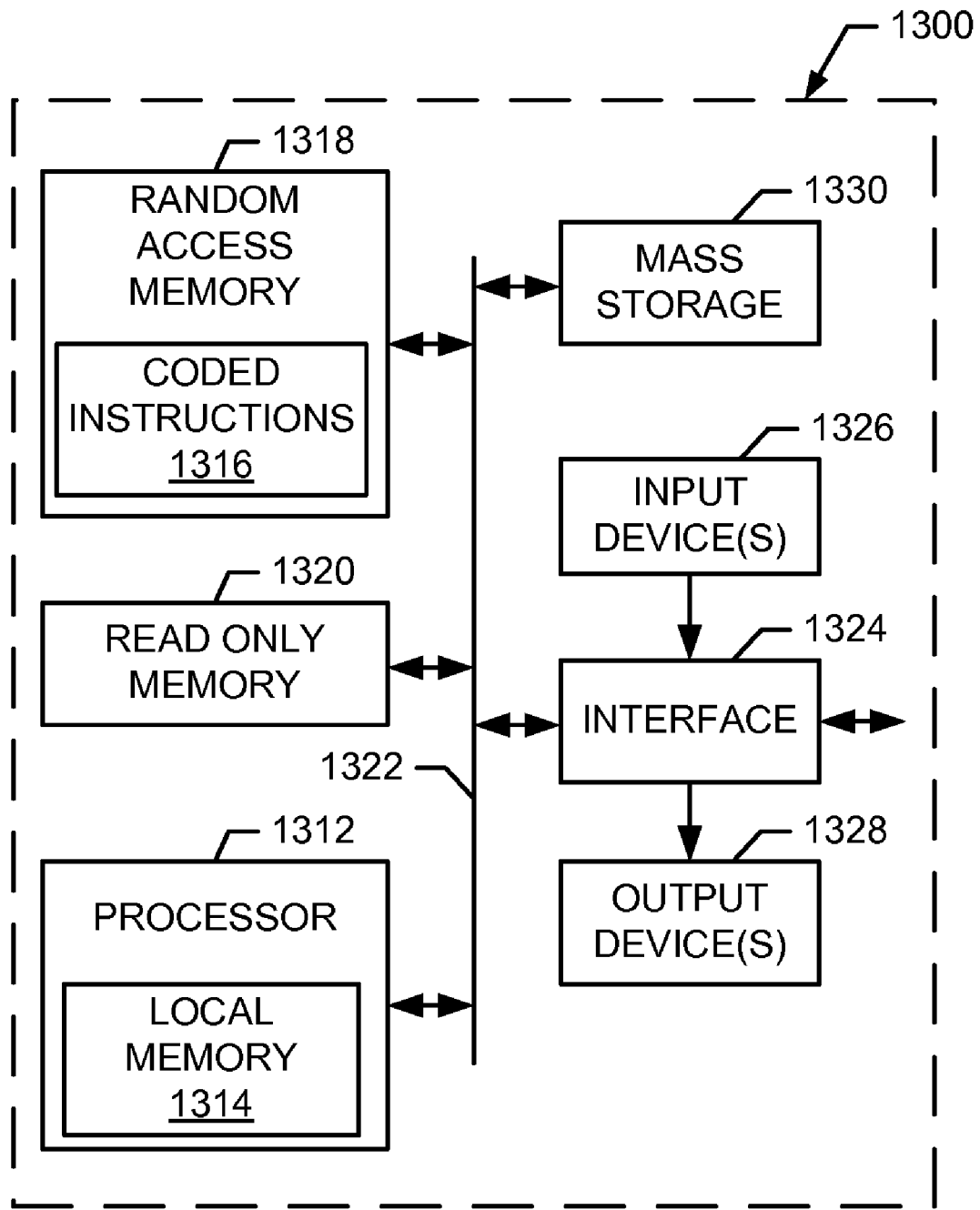
FIG. 13 is a schematic illustration of an example processor platform that may be used and/or programmed to execute the instructions of FIGS. 10, 11A, 11B, 11C, and 12 to implement the example Trochilus server of FIG. 4 and/or to carry out the deployment, monitoring, and routing of network layer functionalities.

FIG. 13 is a block diagram of an example computer system 1300 capable of implementing the systems and methods disclosed herein. The computer 1300 can be, for example, a server, a personal computer, an internet appliance, or any other type of computing device. Any or all of the example Trochilus servers 140.1-140.7 of FIG. 1 may be implemented by the example computer 1300.

The system 1300 of the illustrated example includes a processor 1312 such as a general purpose programmable processor. The processor 1312 includes a local memory 1314, and executes coded instructions 1316 present in the local memory 1314 and/or in another memory device. The coded instructions 1316 may include some or all of the instructions represented in FIGS. 10, 11A, 11B, 11C, and/or 12. The processor 1312 may be any type of processing unit, such as one or more microprocessors from the Intel® Centrino® family of microprocessors, the Intel® Pentium® family of microprocessors, the Intel® Itanium® family of microprocessors, the Intel® Core® family of microprocessors, and/or the Intel® XScale® family of processors. Of course, other processors from other families are also appropriate.

The processor 1312 is in communication with a main memory including a volatile memory 1318 and a non-volatile memory 1320 via a bus 1322. The volatile memory 1318 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1320 may be implemented by flash memory and/or any other desired type of memory device. Access to the main memory 1318, 1320 is typically controlled by a memory controller.

The computer 1300 also includes an interface circuit 1324. The interface circuit 1324 may be implemented by any type of interface standard, such as an Ethernet interface, a universal serial bus (USB), and/or a third generation input/output (3GIO) interface.

One or more input devices 1326 are connected to the interface circuit 1324. The input device(s) 1326 permit a user to enter data and commands into the processor 1312. The input device(s) can be implemented by, for example, a keyboard, a mouse, a touchscreen, a track-pad, a trackball, an isopoint and/or a voice recognition system.

One or more output devices 1328 are also connected to the interface circuit 1324. The output devices 1328 can be implemented, for example, by display devices (e.g., a liquid crystal display, a cathode ray tube display (CRT)), by a printer and/or by speakers. The interface circuit 1324, thus, typically includes a graphics driver card.

The interface circuit 1324 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1300 also includes one or more mass storage devices 1330 for storing software and data. Examples of such mass storage devices 1330 include floppy disk drives, hard drive disks, compact disk drives and digital versatile disk (DVD) drives. The mass storage devices 1330 may implement any or all of the example route database 410, and/or the example performance database 422. Additionally or alternatively, the volatile memory 1318 may implement any or all of the example route database 410, and/or the example performance database 422.

At least some of the above described example methods and/or system are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media.

To the extent the above specification describes example components and functions with reference to particular standards and protocols, it is understood that the scope of this patent is not limited to such standards and protocols. For instance, each of the standards for internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having similar functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to distribute network Internet Protocol traffic, the method comprising:

receiving a first Internet Protocol control packet at an input of a first server, the first Internet Protocol control packet being received from a physical router based on a forwarding table in the physical router that initially causes the first Internet Protocol control packet to be routed from the physical router to the first server;

selecting a first logical router within a router array of multiple logical routers logically included within the physical router to send the first Internet Protocol control packet, the first server selecting the first logical router by matching a destination Internet Protocol address of the first Internet Protocol control packet to a first Internet Protocol address subspace associated with the first logical router;

transmitting the first Internet Protocol control packet to the first logical router;

updating the forwarding table in the physical router by associating the destination Internet Protocol address of the first Internet Protocol control packet with a first control path from the physical router to the first logical router, the first control path being determined based on routing of the first Internet Protocol control packet from the physical router to the first logical router through the first server, the updating of the forwarding table to cause subsequent Internet Protocol data packets associated with the first Internet Protocol control packet to be forwarded from the physical router to the first logical router via the first control path without being routed through the first server; and determining a first interface for the first logical router to return the first Internet Protocol control packet from the first logical router to the physical router.

2. A method as defined in claim 1, wherein the physical router is associated with an Internet Protocol address space, the first Internet Protocol address subspace being a subset of the Internet Protocol address space.

3. A method as defined in claim 1, further comprising transmitting the first Internet Protocol control packet from the first logical router to the physical router via the first interface.

4. A method as defined in claim 3, wherein the first control path routes Internet Protocol data packets having a destination Internet Protocol address similar to the destination Internet Protocol address of the first Internet Protocol control packet from the physical router to the first logical router.

5. A method as defined in claim 3, wherein the first interface is selected based on a packet destination routing table that identifies an Internet Protocol address subspace having a range of destination Internet Protocol addresses for each interface within the physical router.

6. A method as defined in claim 3, further comprising:
selecting a second logical router within the router array to send a second Internet Protocol control packet, the second Internet Protocol control packet being received at the input of the first server from the physical router, the first server selecting the second logical router by matching a destination Internet Protocol address of the second Internet Protocol control packet to a second Internet Protocol address subspace associated with the second logical router;
transmitting the second Internet Protocol control packet to the second logical router;
updating the forwarding table in the physical router by associating the destination Internet Protocol address of the second Internet Protocol control packet with a second control path from the physical router to the second logical router; and
transmitting the second Internet Protocol control packet from the second logical router to the physical router via a second interface.

7. A method as defined in claim 6, further comprising:
upon establishing the second control path, forwarding a second Internet Protocol data packet associated with the second Internet Protocol control packet directly from the physical router to the second logical router via the second control path;
receiving the second Internet Protocol data packet in the second logical router; and
returning the second Internet Protocol data packet from the second logical router to the physical router via the second interface.

8. A method as defined in claim 7, wherein the first logical router and the second logical router are included within the router array, the router array being communicatively coupled to at least one of the server or the physical router.

9. A method as defined in claim 7, further comprising:
activating a third logical router in the router array when a number of received Internet Protocol control packets during a time period exceeds a threshold; and
assigning to the third logical router a third Internet Protocol address subspace that includes at least some of the first IP address subspace or the second Internet Protocol address subspace.

10. A method as defined in claim 9, further comprising reducing a number of Internet Protocol addresses assigned to at least one of the first Internet Protocol address subspace or the second Internet Protocol address subspace.

11. A method as defined in claim 7, further comprising:
deactivating the second logical router when a number of received Internet Protocol control packets during a time period is below a threshold; and
assigning the second address subspace to the first logical router.

12. A method as defined in claim 3, wherein after receiving the first Internet Protocol control packet from the first logical router via the first interface, the physical router is to statically forward the first Internet Protocol control packet to a destination without accessing any routing or forwarding tables.

13. A method as defined in claim 1, wherein matching the first destination address of the first Internet Protocol control packet to the first Internet Protocol address subspace includes at least one of matching a forwarding address or matching a next hop address.

14. A method as defined in claim 1, further comprising:
upon establishing the first control path, forwarding a first Internet Protocol data packet associated with the first Internet Protocol control packet from the physical router to the first logical router via the first control path; and
returning the first Internet Protocol data packet from the first logical router to the physical router via the first interface.

15. A server to distribute network Internet Protocol traffic, the server comprising:
a memory to store machine readable instructions;
a receiver to receive a first Internet Protocol control packet from a physical router based on a forwarding table in the physical router that initially causes the first Internet Protocol control packet to be routed from the physical router to the server;
a route selector implemented by a processor, the processor to execute the machine readable instructions to:
select a first logical router within a router array of multiple logical routers partitioned within the physical router to send the first Internet Protocol control packet by matching a destination Internet Protocol address within the first Internet Protocol control packet to a first Internet Protocol address subspace associated with the first logical router;
update the forwarding table in the physical router by associating the destination Internet Protocol address of the first Internet Protocol control packet with a first control path from the physical router to the first logical router, the first control path being determined based on routing of the first Internet Protocol control packet from the physical router to the first logical router through the server, the updating of the forwarding table to cause a first Internet Protocol data packet associated with the first Internet Protocol control packet to be forwarded from the physical router to the first logical router via the first control path without being routed through the server; and
determine a first interface for the first logical router to return the first Internet Protocol control packet from the first logical router to the physical router; and
a transmitter to transmit the first Internet Protocol control packet to the first logical router.

16. A server as defined in claim 15, wherein the first control path is to route Internet Protocol data packets having a destination Internet Protocol address similar to the destination Internet Protocol address of the first Internet Protocol control packet from the physical router to the first logical router.

17. A server as defined in claim 15, wherein the first logical router is to transmit the first Internet Protocol control packet to the physical router via the first interface.

18. A server as defined in claim 17, wherein after receiving the first Internet Protocol control packet from the first logical router via the first interface, the physical router is to statically forward the first Internet Protocol control packet to a destination without accessing any routing or forwarding tables.

19. A server as defined in claim 15, wherein the route selector is to determine the first interface by accessing a packet destination routing table and matching a range of destination Internet Protocol addresses associated with the first interface to the destination Internet Protocol address associated with the first Internet Protocol control packet.

20. A server as defined in claim 15, wherein upon establishing the first control path, the physical router is to forward a first Internet Protocol data packet associated with the first Internet Protocol control packet to the first logical router.

21. A server as defined in claim 20, wherein upon receiving the first Internet Protocol data packet, the first logical router is to transmit the first Internet Protocol data packet to the physical router via the first interface.

22. A server as defined in claim 15, wherein the route selector is to:
  select a second logical router within the router array to send a second Internet Protocol control packet by matching a destination Internet Protocol address within the second Internet Protocol control packet to a second Internet Protocol address subspace associated with the second logical router;
  update the forwarding table in the physical router by associating the destination Internet Protocol address of the second Internet Protocol control packet with a second control path from the physical router to the second logical router; and
  determine a second interface for the second logical router to transmit the second Internet Protocol control packet from the second logical router to the physical router.

23. A server as defined in claim 22, wherein the second logical router is to transmit the second Internet Protocol control packet to the physical router via the second interface.

24. A server as defined in claim 22, wherein upon establishing the second control path, the physical router is to forward a second Internet Protocol data packet associated with the second Internet Protocol control packet to the second logical router.

25. A server as defined in claim 24, wherein upon receiving the second Internet Protocol data packet, the second logical router is to return the second Internet Protocol data packet to the physical router via the second interface.

26. A server as defined in claim 25, wherein the route selector is to:
  activate a third logical router within the router array when a number of received Internet Protocol control packets during a time period exceeds a threshold; and
  assign to the third logical router a third Internet Protocol address subspace that includes at least some of the first Internet Protocol address subspace or the second Internet Protocol address subspace.

27. A server as defined in claim 26, wherein the route selector reduces a number of Internet Protocol addresses assigned to at least one of the first Internet Protocol address subspace or the second Internet Protocol address subspace.

28. A server as defined in claim 27, wherein the route selector is to:
  deactivate the second logical router when a number of received Internet Protocol control packets during a timer period is below a threshold; and
  assign to the second address subspace to the first logical router.

29. A server as defined in claim 26, wherein the first logical router, the second logical router, and the third logical router are at least one of sub-routers, auxiliary routers, or supplementary routers.

30. A tangible non-transitory machine readable storage medium comprising instructions that, when executed, cause a machine to perform a method comprising:
  selecting a first logical router within a router array of multiple logical routers within the a physical router to send the a first Internet Protocol control packet, the first Internet Protocol control packet to be received at an input of a first server from the physical router based on a forwarding table in the physical router that initially causes the first Internet Protocol control packet to be routed from the physical router to the first server, the first server to select the first logical router by matching a destination Internet Protocol address of the first Internet Protocol control packet to a first Internet Protocol address subspace associated with the first logical router;
  transmitting the first Internet Protocol control packet to the first logical router;
  updating the forwarding table used by the physical router by associating the destination Internet Protocol address of the first Internet Protocol control packet with a first control path from the physical router to the first logical router, the first control path being determined based on routing of the first Internet Protocol control packet from the physical router to the first logical router through the first server, the updating of the forwarding table to cause a first Internet Protocol data packet associated with the first Internet Protocol control packet to be forwarded from the physical router to the first logical router via the first control path without being routed through the first server; and
  determining a first interface for the first logical router to return the first Internet Protocol control packet from the first logical router to the physical router.

* * * * *